(12) United States Patent
Kim et al.

(10) Patent No.: US 12,314,085 B2
(45) Date of Patent: May 27, 2025

(54) DISPLAY DEVICE

(71) Applicant: Samsung Display Co., LTD., Yongin-si (KR)

(72) Inventors: Kyung Man Kim, Anyang-si (KR); Sang Hoon Kim, Hwaseong-si (KR); Sung Hoon Kim, Hwaseong-si (KR); Seung Ho Kim, Asan-si (KR); Yu Ri Kim, Guri-si (KR); Seong Jin Hwang, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 251 days.

(21) Appl. No.: 17/969,068

(22) Filed: Oct. 19, 2022

(65) Prior Publication Data
US 2023/0213979 A1     Jul. 6, 2023

(30) Foreign Application Priority Data

Jan. 4, 2022    (KR) .................. 10-2022-0000690

(51) Int. Cl.
*G06F 1/16*          (2006.01)
*G09F 9/30*         (2006.01)

(52) U.S. Cl.
CPC .......... *G06F 1/1656* (2013.01); *G06F 1/1616* (2013.01); *G06F 1/1637* (2013.01); *G06F 1/1643* (2013.01); *G06F 1/1681* (2013.01); *G09F 9/301* (2013.01); *G06F 1/1652* (2013.01)

(58) Field of Classification Search
CPC .... G06F 1/1656; G06F 1/1616; G06F 1/1643; G06F 1/1681; G06F 1/1637; G06F 1/1652; G09F 9/301
See application file for complete search history.

(56) References Cited

U.S. PATENT DOCUMENTS

| 8,845,916 | B2 * | 9/2014 | Shin | C03C 15/00 438/714 |
| 9,507,191 | B2 * | 11/2016 | Park | H10K 59/35 |
| 10,020,462 | B1 * | 7/2018 | Ai | H10K 59/871 |
| 10,104,790 | B2 * | 10/2018 | Lee | G06F 1/1616 |
| 10,209,789 | B2 * | 2/2019 | Krishnakumar | G06V 10/17 |
| 10,304,870 | B2 * | 5/2019 | Kim | H10D 86/451 |
| 10,579,105 | B2 * | 3/2020 | Jones | G09F 9/301 |
| 10,592,051 | B1 * | 3/2020 | Yildiz | G06F 1/1694 |

(Continued)

FOREIGN PATENT DOCUMENTS

| JP | 2019219545 | * 12/2019 |
| JP | 2019219545 A | * 12/2019 |

*Primary Examiner* — Rockshana D Chowdhury
*Assistant Examiner* — Martin Antonio Asmat Uceda
(74) *Attorney, Agent, or Firm* — KILE PARK REED & HOUTTEMAN PLLC

(57) ABSTRACT

A display device includes a display panel; and a window disposed on an upper surface of the display panel, the window includes a first flat panel part; a second flat panel part disposed on a side of the first flat panel part in a first direction; and a first segment part disposed between the first flat panel part and the second flat panel part, the first segment part includes segments extended in a second direction intersecting the first direction and spaced apart from each other in the first direction; and bridges connecting both ends of each of the segments in the second direction, the segments and the bridges include a same material.

20 Claims, 32 Drawing Sheets

(56) References Cited

U.S. PATENT DOCUMENTS

| | | | |
|---|---|---|---|
| 10,719,145 B1* | 7/2020 | Files | G06F 1/169 |
| 10,983,256 B2* | 4/2021 | Huang | H10K 59/8792 |
| 11,050,039 B2* | 6/2021 | Hong | G02F 1/133524 |
| 11,320,866 B2* | 5/2022 | Sunwoo | G06F 1/1641 |
| 11,610,520 B2* | 3/2023 | Park | G06F 1/1641 |
| 11,647,644 B2* | 5/2023 | Sunwoo | H10K 71/80 |
| | | | 257/40 |
| 11,675,446 B2* | 6/2023 | Kim | G06F 3/038 |
| | | | 345/174 |
| 11,758,752 B2* | 9/2023 | Hyun | H10K 50/841 |
| | | | 257/88 |
| 12,014,018 B2* | 6/2024 | Tatsuno | G06F 3/046 |
| 2015/0017819 A1* | 1/2015 | Bolotin | H05K 5/0278 |
| | | | 439/31 |
| 2017/0150599 A1* | 5/2017 | Myung | H10D 86/60 |
| 2020/0262746 A1* | 8/2020 | He | B32B 19/045 |
| 2024/0040723 A1* | 2/2024 | Feng | H04M 1/022 |

\* cited by examiner

DISPLAY DEVICE

CROSS-REFERENCE TO RELATED APPLICATION(S)

This application claims priority to and benefits of Korean Patent Application No. 10-2022-0000690 filed on Jan. 4, 2022 under 35 U.S.C. § 119 in the Korean Intellectual Property Office, the entire contents of which are incorporated herein by reference.

BACKGROUND

1. Technical Field

The disclosure relates to a display device.

2. Description of the Related Art

With the advancement of multimedia, the importance of display devices has been enhanced. Accordingly, various types of display devices such as an organic light emitting display device and a liquid crystal display device have been used.

Recently, with the development of the display technology, research and development of a display device having a flexible display are actively ongoing. The flexible display may extend or downsize a display screen by folding, bending and sliding the display screen, and thus makes a great contribution to volume downsizing or design change of the display device.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

An object of the disclosure is to provide a display device that may include a window with improved bending performance and improved mechanism reliability.

The objects of the disclosure are not limited to those mentioned above and additional objects of the disclosure will be clearly understood by those skilled in the art from the following description of the disclosure.

In the display device according to an embodiment, mechanism reliability and bending performance of a window may be improved.

The effects according to embodiments are not limited to those mentioned above and more various effects are included in the following description of the disclosure.

A display device may include a display panel; and a window disposed on an upper surface of the display panel, wherein the window may include a first flat panel part; a second flat panel part disposed on a side of the first flat panel part in a first direction; and a first segment part disposed between the first flat panel part and the second flat panel part, wherein the first segment part may include segments extended in a second direction intersecting the first direction and spaced apart from each other in the first direction; and bridges connecting both ends of each of the segments in the second direction, and the segments and the bridges may include a same material.

In an embodiment, each of the segments may have a shape including a width in the first direction reduced toward an upper surface of the display panel.

In an embodiment, a curing resin may be disposed between gap spaces of respective segments of the first segment part.

In an embodiment, each of the bridges may be thinner than each of the segments.

In an embodiment, each of the bridges may have a thickness in a range of about 20 µm to about 50 µm.

In an embodiment, each of the segments of the first segment part may be integral with each of the bridges and may comprise glass.

In an embodiment, each of the bridges may form at least one bent part bent in a direction toward the display panel.

In an embodiment, a display device may further include a first adhesive member disposed between the display panel and the window, wherein a rear surface of each of the segments of the segment part may be attached to the first adhesive member, and a lowermost end portion of the bent part of each of the bridges may be spaced apart from the first adhesive member.

In an embodiment, a display device may further include a metal support disposed below the display panel, wherein the metal support may include a first metal support member overlapping the first flat panel part of the window in a plan view; a second metal support member spaced apart from the first metal support member and overlapping the second flat panel part in the plan view; and a gap space between the first metal support member and the second metal support member overlaps the first segment part in the plan view.

In an embodiment, a display device may further include a digitizer disposed below the display panel, wherein the digitizer may include a first digitizer overlapping the first flat panel part of the window in a plan view and a second digitizer spaced apart from the first digitizer and overlapping the second flat panel part in the plan view, and a gap space between the first digitizer and the second digitizer overlaps the first segment part in the plan view.

In an embodiment, the window may include a third flat panel part disposed on a side of the second flat panel part in the first direction, and a second segment part disposed between the second flat panel part and the third flat panel part, including the segments and the bridges, and the display panel may include a first flat portion overlapping the first flat panel part in a plan view, a second flat portion overlapping the second flat panel part in the plan view, a third flat portion overlapping the third flat panel part in the plan view, a first bending portion overlapping the first segment part in the plan view, and a second bending portion overlapping the second segment part in the plan view.

According to an embodiment, a display device may include a display panel including a display area and a non-display area adjacent to the display area; and a window disposed on an upper surface of the display panel, wherein the window may include a first flat panel part; a second flat panel part disposed on a side of the first flat panel part in a first direction; and a first segment part disposed between the first flat panel part and the second flat panel part, wherein the first segment part may include segments extended in a second direction intersecting the first direction and spaced apart from each other in the first direction; and bridges connecting respective segments, wherein one of the bridges overlaps the display area of the display panel in a plan view.

In an embodiment, each of the bridges may be thinner than each of the segments.

In an embodiment, the bridges may include a first bridge overlapping the non-display area of the display panel in the plan view; and a second bridge overlapping the display area in the plan view, the first bridge may have a thickness in a range of about 20 µm to about 50 µm, and forms at least one bent part curved in a direction toward the display panel, and the second bridge has a flat panel shape having a thickness in a range of about 20 µm to about 50 µm.

In an embodiment, a display device may further include a first adhesive member disposed between the display panel and the window, wherein a rear surface of each of the segments of the segment part may be attached to the first adhesive member, and a lowermost end portion of the bent part of the first bridge may be spaced apart from the first adhesive member.

In an embodiment, the bridges may include a third bridge disposed between the first bridge and the second bridge, and the third bridge may overlap the display area of the display panel in the plan view.

In an embodiment, the third bridge may form at least one bent part bent in a direction toward the display panel, and a number of bent parts of the first bridge may be greater than a number of bent parts of the third bridge.

According to an embodiment, a display device may include a display panel including a first flat portion, a second flat portion disposed on a side of the first flat portion in a first direction, and a first bending portion disposed between the first flat portion and the second flat portion; a window disposed on an upper surface of the display panel, the window including a first flat panel part overlapping the first flat portion in a plan view, a second flat panel part overlapping the second flat portion in the plan view and a first segment part overlapping the first bending portion in the plan view; and a set member accommodating the display panel and the window, wherein the first segment part may include segments extended in a second direction intersecting the first direction and spaced apart from each other in the first direction and bridges connecting edge portions disposed at both ends of each of the segments in the second direction, and the set member may include a first set member accommodating the first flat portion of the display panel and the first flat panel part of the window and a second set member accommodating the second flat portion and the second flat panel part.

In an embodiment, a curing resin may be disposed between gap spaces of respective segments, and the set member further may include a bracket disposed between the first set member and the second set member covering the edge portions of respective segments and the bridges.

In an embodiment, the set member may include a hinge part disposed between the first set member and the second set member, and the hinge part may overlap the bracket in a plan view.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
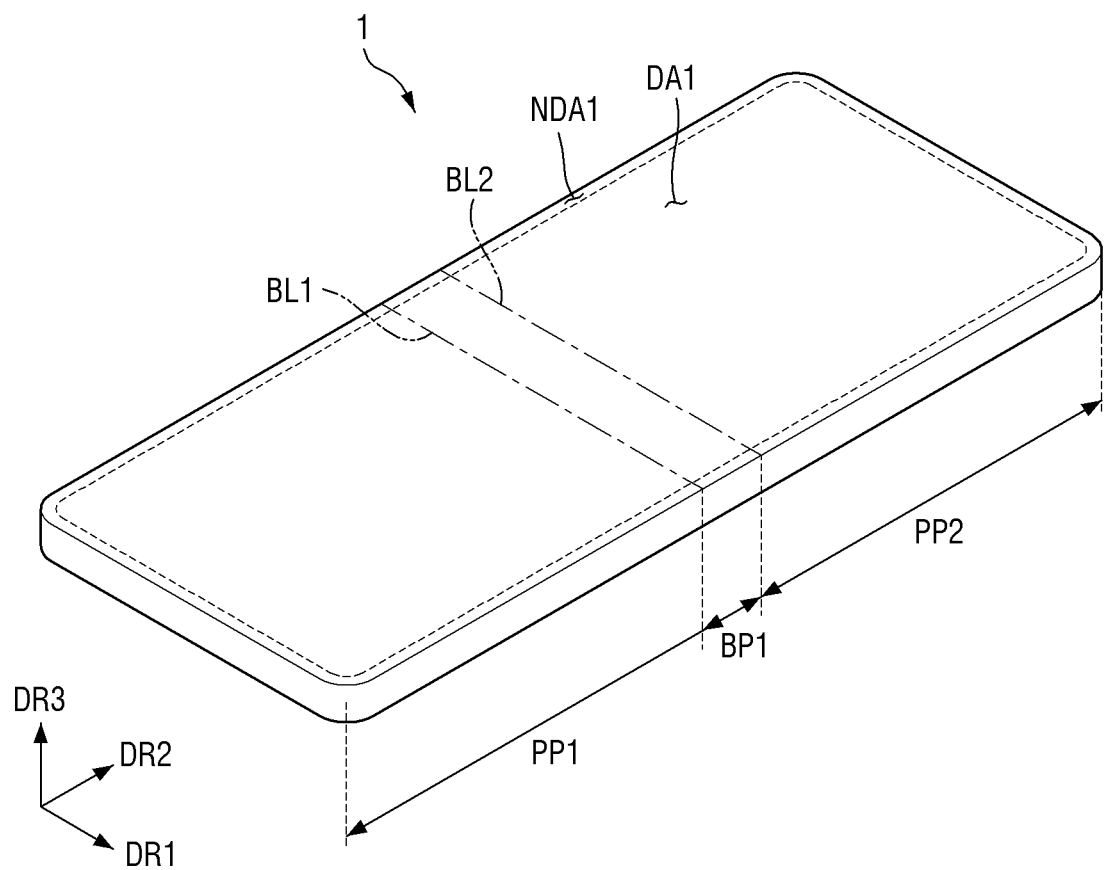
FIG. 1 is a schematic perspective view illustrating a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will also be understood that when a layer is referred to as being "on" another layer or substrate, it can be directly on the other layer or substrate, or intervening layers may also be present. The same reference numbers indicate the same components throughout the specification.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Features of each of various embodiments may be partially or entirely combined with each other and may technically variously interwork with each other, and respective embodiments may be implemented independently of each other or may be implemented together in association with each other.

Hereinafter, detailed embodiments of the disclosure will be described with reference to the accompanying drawings.

Figure 2:
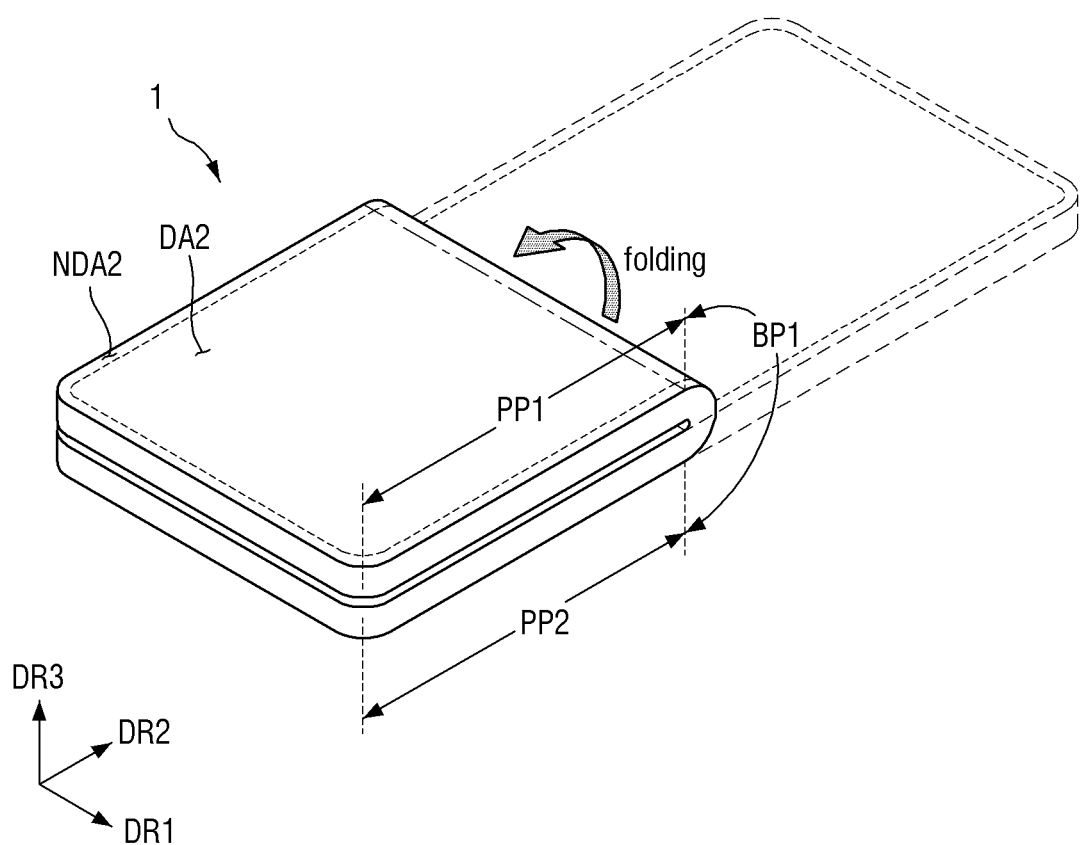
FIG. 2 is a schematic perspective view illustrating the state that the display device according to an embodiment of FIG. 1 is folded.
Figure 3:
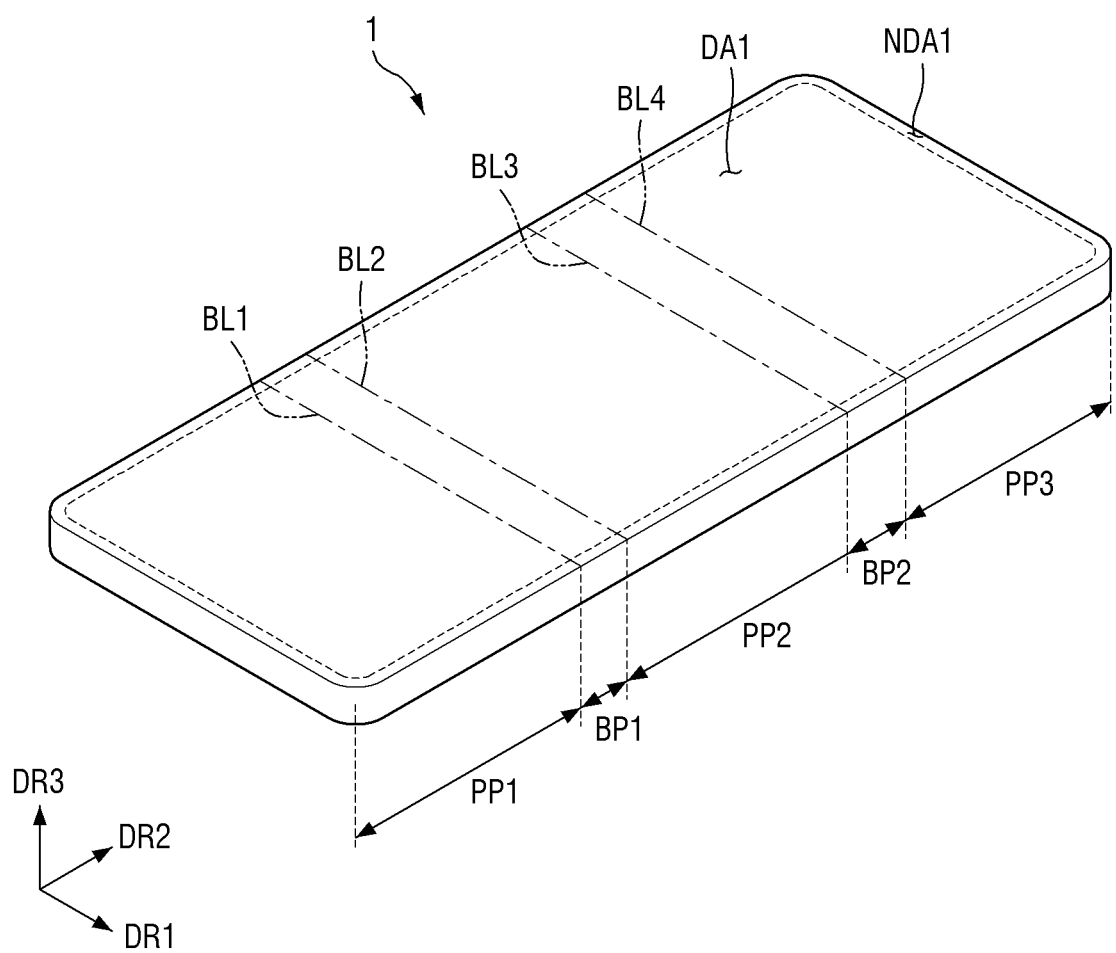
FIG. 3 is a schematic perspective view illustrating a display device according to an embodiment.
Figure 4:
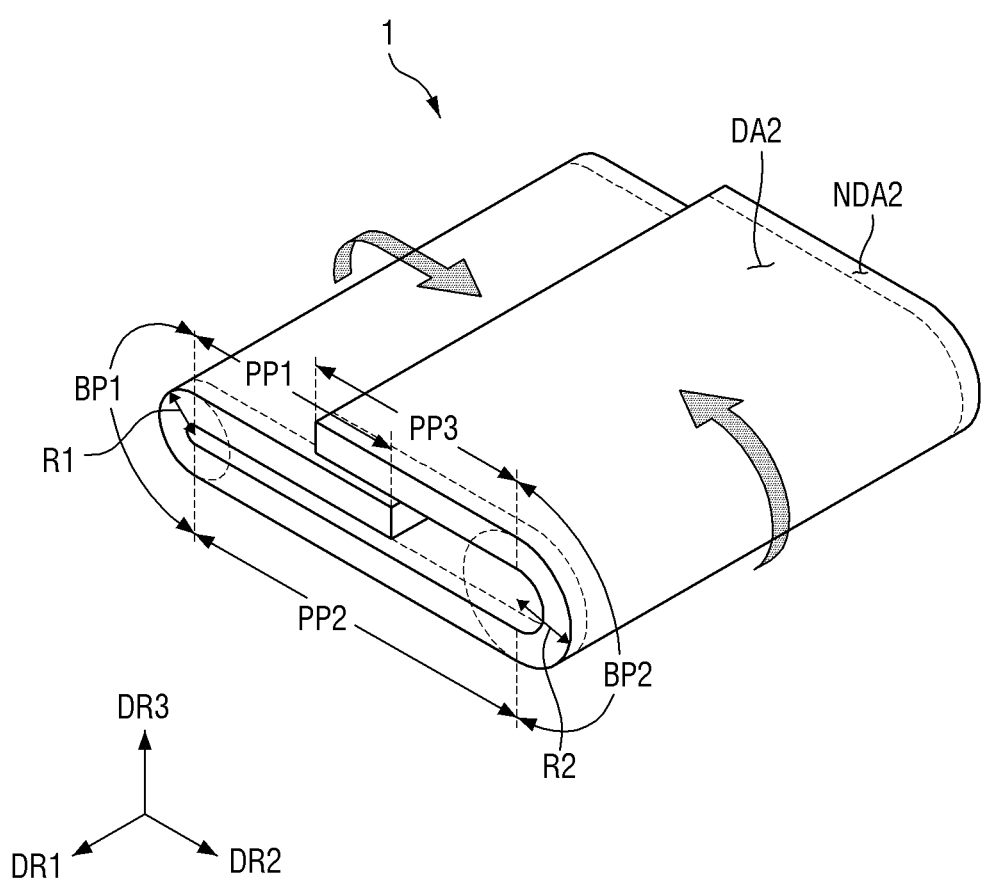
FIGS. 4 and 5 are schematic perspective views illustrating the state that the display device according to an embodiment of FIG. 3 is folded.
Figure 5:
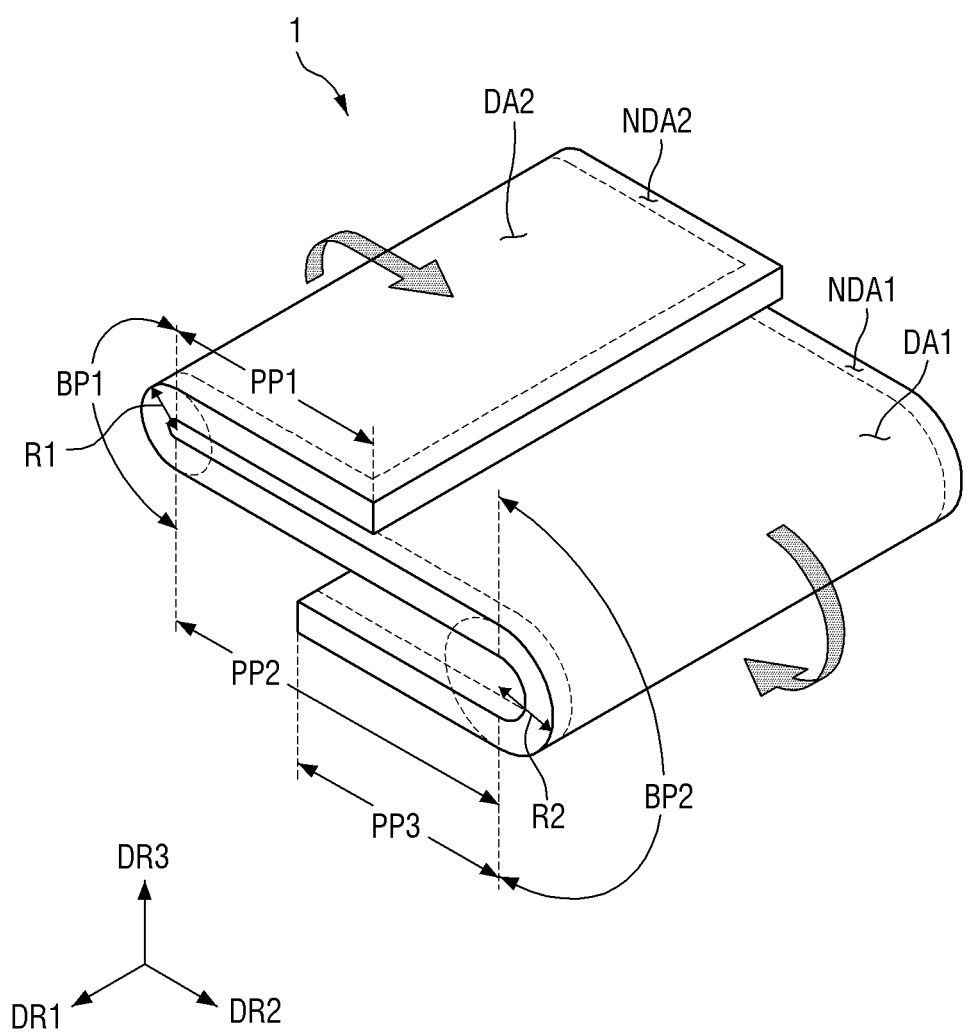

FIG. 1 is a schematic perspective view illustrating a display device according to an embodiment. FIG. 2 is a schematic perspective view illustrating the state that the display device according to an embodiment of FIG. 1 is folded. FIG. 3 is a schematic perspective view illustrating a display device according to an embodiment. FIGS. 4 and 5 are schematic perspective views illustrating the state that the display device according to an embodiment of FIG. 3 is folded.

Referring to FIGS. 1 to 5, a display device 1 according to an embodiment is a device that displays a moving image or a still image. The display device 1 may be used as a display screen of various products such as a television, a laptop computer, a monitor, a billboard and a device for Internet of things (IoT) as well as portable electronic devices such as a mobile phone, a smart phone, a tablet PC, a smart watch, a watch phone, a mobile communication terminal, an electronic notebook, an electronic book, a navigation device and an ultra mobile PC (UMPC).

As shown in FIGS. 1 and 2, the display device 1 according to an embodiment may be a single foldable display device in which a portion may be folded (or bent) in a bending line, but is not limited thereto. For example, the display device 1 according to an embodiment may be a multi-foldable display device in which various portions may be folded in a bending line, as shown in FIGS. 3 to 5. Hereinafter, the single foldable display device will be described, and the multi-foldable display device will be described later.

FIG. 1 illustrates a first state of the display device 1 unfolded without being bent in the bending lines, and FIG. 2 illustrates a second state of the display device 1 bent in the bending lines.

The display device 1 has a three-dimensional shape. In the drawings, a direction parallel with a first side (vertical side) of the display device 1 is marked with a first direction DR1, a direction parallel with a second side (horizontal side) of a display panel PNL is marked with a second direction DR2, and a thickness direction of the display device 1 is marked with a third direction DR3. In the description below, unless otherwise specified, "direction" may refer to all directions toward both sides that are extended along the direction. In case that it is necessary to distinguish both "directions" extended to both sides, one side or a side will be referred to as "one side or a side direction" and the other side will be referred to as "the other side direction". Based on FIG. 1, a direction in which an arrow is directed will be referred to as one side or a side, and its opposite direction will be referred to as the other side. The first to third directions DR1 to DR3 may be perpendicular to one another, but are not limited thereto.

In an embodiment, the display device 1 has a rectangular planar shape such as a rectangle in which a vertical side is formed to be shorter than a horizontal side, as shown in FIG. 1, and each of corners of the display device 1 may have a rectangular planar shape or a rounded planar shape, but is not limited thereto. For example, the display device 1 may have a rectangular planar shape such as a rectangle in which a vertical side is formed to be shorter than a horizontal side.

The display device 1 may include a first flat portion PP1, a first bending portion BP1, and a second flat portion PP2.

The first flat portion PP1 and the second flat portion PP2 may be always flat portions that are not bent. The first flat portion PP1 may be disposed on the other side in the second direction DR2 as a portion of the display device 1. The second flat portion PP2 may be disposed on one side or a side in the second direction DR2 as a portion of the display device 1.

The first bending portion BP1 may be a bendable area. The first bending portion BP1 may be disposed between the first flat portion PP1 and the second flat portion PP2. For example, the second flat portion PP2 may be disposed on one side or a side of the first bending portion BP1 in the second direction DR2, and the first flat portion PP1 may be disposed on the other side of the first bending portion BP1 in the second direction DR2.

The first bending portion BP1 may be an area defined by a first bending line BL1 and a second bending line BL2. The first bending line BL1 and the second bending line BL2 may be positions where the first bending portion BP1 is bent. The first bending line BL1 may be a boundary where the first flat portion PP1 and the first bending portion BP1 adjoin each other, and the second bending line BL2 may be a boundary where the second flat portion PP2 and the first bending portion BP1 adjoin each other. The first bending line BL1 and the second bending line BL2 may be extended in the first direction DR1, but are not limited thereto.

In case that the first bending portion BP1 is not bent, the display device 1 may maintain an unfolded state (hereinafter, referred to as 'first state') as shown in FIG. 1, and in case that the first bending portion BP1 is bent, the display device 1 may maintain a folded state (hereinafter, referred to as 'second state') as shown in FIG. 2. The display device 1 may be folded in the second direction DR2 by the first bending line BL1 and the second bending line BL2 in the first state and may be switched to the second state. As a result, since a length of the display device 1 in the second direction DR2 may be reduced to a half, approximately, a user may conveniently carry the display device 1.

The display device 1 may include a display area DA and a non-display area NDA.

The display area may be an area where a pixel is disposed to display a screen. The display area DA may include a first display area DA1 and a second display area DA2. The non-display area NDA may be an area that does not display a screen. The non-display area may include a first non-display area NDA1 and a second non-display area NDA2. In the first state of the display device 1, one side or a side of the display device 1 in the third direction DR3 may be a front surface on which the first display area DA1 and the first non-display area NDA1 are disposed, and the other side of the display device 1 in the third direction DR3 may be a rear surface on which the second display area DA2 and the second non-display area NDA2 are disposed.

The first display area DA1 may be disposed on one side or a side of the display device 1 in the third direction DR3 as shown in FIG. 1 in the first state of the display device 1. The first flat portion PP1, the first bending portion BP1 and the second flat portion PP2 may include at least a portion of the first display area DA1. In the first state of the display device 1, one side or a side of the display device 1 in the third direction DR3 may be a front surface on which the first display area DA1 is disposed, and the other side of the display device 1 in the third direction DR3 may be a rear surface on which the first display area DA1 is not disposed. A planar shape of the first display area DA1 may follow that of the display device 1 of the first state. For example, in case that the planar shape of the display device 1 of the first state is a rectangular shape, the planar shape of the first display area DA1 may be also a rectangular shape.

The first non-display area NDA1 may be disposed near the first display area DA1. The first non-display area NDA1 may be disposed to surround or may be adjacent to the first display area DA1, but is not limited thereto. For example, the first display area DA1 may be partially surrounded by the first non-display area NDA1. The first flat portion PP1, the first bending portion BP1 and the second flat portion PP2 may include at least a portion of the first non-display area NDA1.

The second display area DA2 may be disposed on the other side of the display device 1 in the third direction DR3 in the first state of the display device 1, and may overlap only the first flat portion PP1, but is not limited thereto. The second display area DA2 may display a screen to a user in case that the display device 1 is in the second state. For example, the second display area DA2 may be disposed on a rear surface of the first flat portion PP1, and the second display area DA2 may not be disposed on the rear surface of the first bending portion BP1 and the second flat portion PP2. As shown in FIG. 2, the second display area DA2 may follow the planar shape of the display device 1 of the second state. For example, in case that the planar shape of the display device 1 of the first state is a rectangular shape, the planar shape of the first display area DA1 may be also a rectangular shape.

In an embodiment, the first non-display area NDA1 and the second non-display area NDA2 may be areas covered by a set member SET (see FIG. 13), which will be described later, but are not limited thereto.

The second non-display area NDA2 may be disposed near the second display area DA2 in the display device 1 of the first state, and may overlap the first bending portion BP1 and the second flat portion PP2 in the third direction DR3. For example, the second display area DA2 may not be disposed on rear surfaces of the first bending portion BP1 and the second flat portion PP2, but be disposed on only the second non-display area NDA2. The second non-display area NDA2 may be disposed to surround or may be adjacent to the second display area DA2, but is not limited thereto. For example, the second display area DA2 may be partially surrounded by the second non-display area NDA2.

As shown in FIG. 2, in the second state, the display device 1 may be folded in an in-folding manner in which a portion of the first display area DA1 overlapped the first flat portion PP1 and a portion of the first display area DA1 overlapped the second flat portion PP2 are folded to face each other, but is not limited thereto. For example, the display device 1 may be folded in an out-folding manner such that the rear surfaces face each other.

The display device 1 may further include a second bending portion BP2 and a third flat portion PP3.

The third flat portion PP3 may be always a flat portion that is not bent. The third flat portion PP3 may be disposed on one side or a side in the second direction DR2 as a portion of the display device 1. In other words, the third flat portion PP3 may be disposed on one side or a side of second flat portion PP2 in the second direction DR2.

The second bending portion BP2 may be a bendable area. The second bending portion BP2 may be disposed between the second flat portion PP2 and the third flat portion PP3. For example, the third flat portion PP3 may be disposed on one side or a side of the second bending portion BP2 in the second direction DR2, and the second flat portion PP2 may be disposed on the other side of the second bending portion BP2 in the second direction DR2.

The second bending portion BP2 may be an area defined by a third bending line BL3 and a fourth bending line BL4. The third bending line BL3 and the fourth bending line BL4 may be a position where the second bending portion BP2 is bent. The third bending line BL3 may be a boundary where the second flat portion PP2 and the second bending portion BP2 adjoin each other, and the fourth bending line BL4 may be a boundary where the third flat portion PP3 and the second bending portion BP2 adjoin each other. The third bending line BL3 and the fourth bending line BL4 may be extended in the first direction DR1, but are not limited thereto.

In case that the display device 1 further may include the second bending portion BP2 and the third flat portion PP3 as described above, the display device 1 may be a multi-foldable display device in which several portions may be folded in the bending line.

In case that the first bending portion BP1 and the second bending portion BP2 are not bent, the display device 1 may maintain an unfolded state, for example, the first state, as shown in FIG. 3, and in case that at least one of the first bending portion BP1 or the second bending portion BP2 is bent, the display device 1 may maintain a folded state, for example, the second state, as shown in FIGS. 4 and 5. The display device 1 may be folded in the second direction DR2 by the first bending line BL1, the second bending line BL2, the third bending line BL3 and the fourth bending line BL4 in the first state and switched to the second state.

A width of the second bending portion BP2 in the second direction DR2 may be greater than that of the first bending portion BP1 in the second direction DR2. Therefore, as shown in FIGS. 4 and 5, a curvature radius R1 in the first bending portion BP1 may be smaller than a curvature radius R2 of the second bending portion BP2 in a state that the display device 1 is bent.

As shown in FIG. 4, in the second state, the display device 1 may be folded in an in-folding manner in which a portion of the first display area DA1 overlapped the third flat portion PP3 and a portion of the first display area DA1 overlapped the second flat portion PP2 are folded to face each other, but is not limited thereto. For example, the display device 1 may be folded in an out-folding manner such that a portion of the second display area DA2 overlapped the first flat portion PP1 and the third flat portion PP3 and a portion of the second display area DA2 overlapped the second flat portion PP2 are folded to face each other, or any one of the first flat portion PP1 or the third flat portion PP3 may be folded in an in-folding manner or the other one thereof may be folded in an out-folding manner, as shown in FIG. 5.

As described above, the display device 1 according to an embodiment may be folded as a single foldable or multi-foldable display device. Hereinafter, for convenience of description, the following description will be based on a single foldable display device.

Figure 6A:
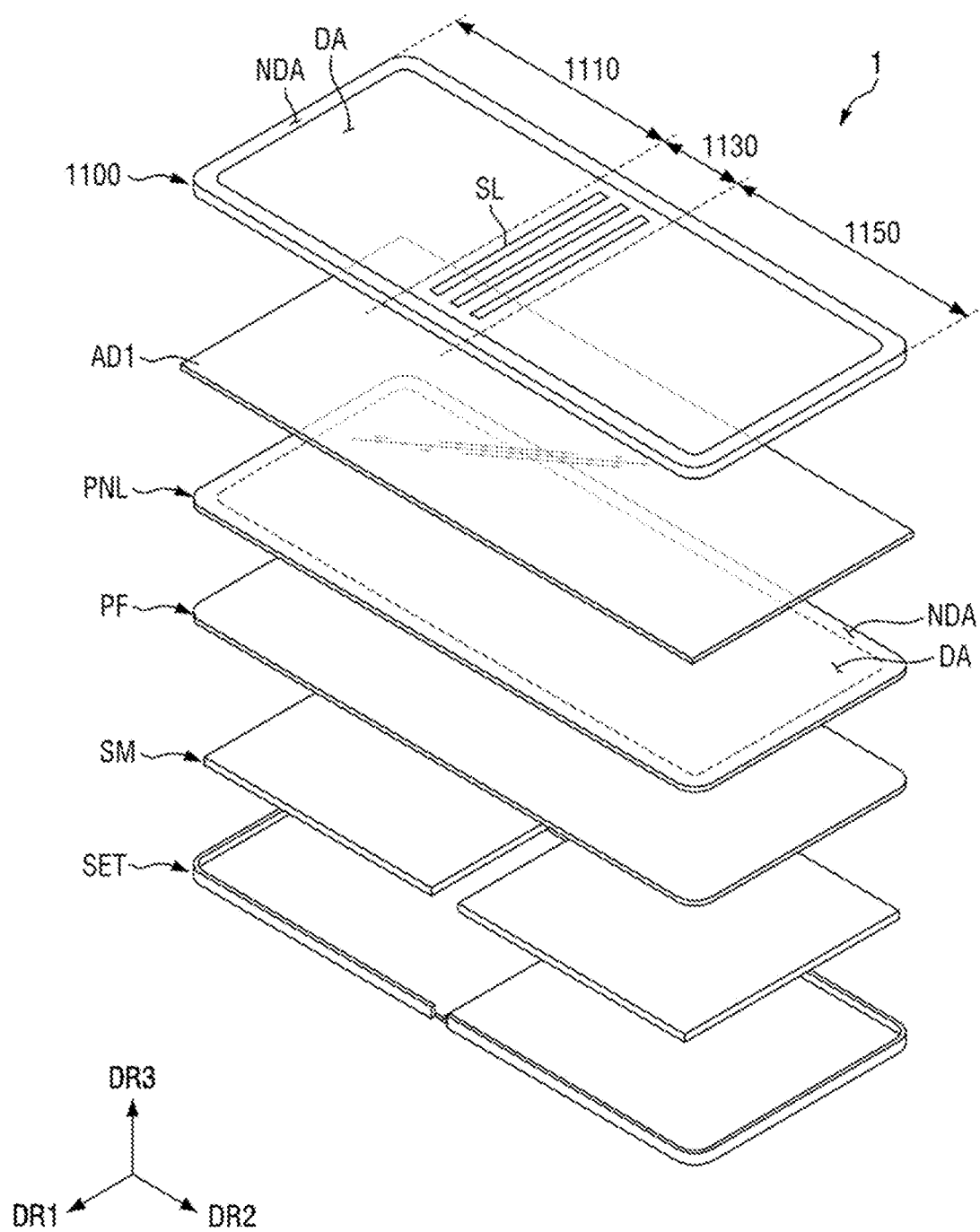
FIG. 6A is a schematic exploded perspective view illustrating a display device according to an embodiment of FIG. 1.
Figure 6B:
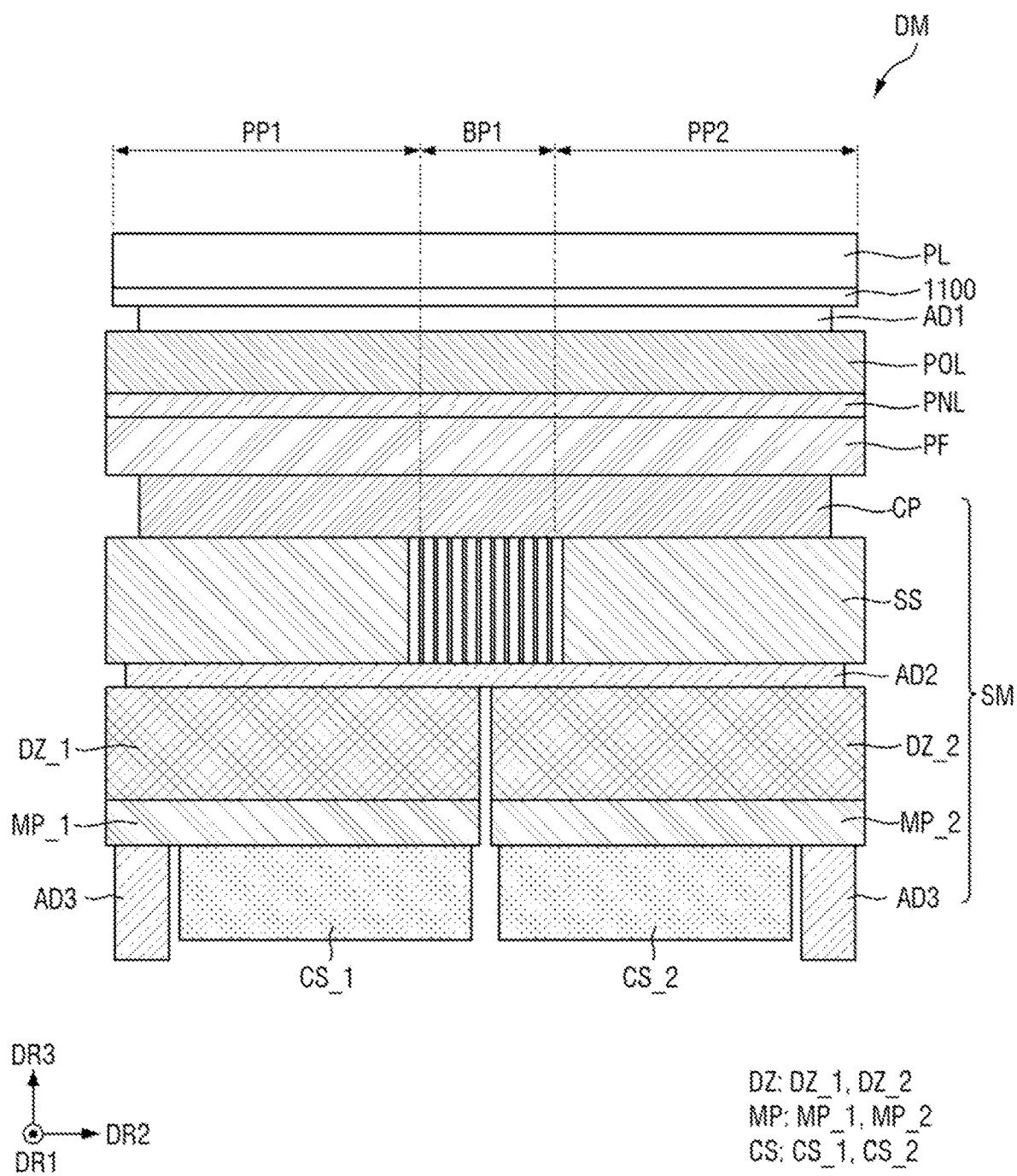
FIG. 6B is a structural view illustrating a schematic structure of a display module of a display device according to an embodiment of FIG. 1.

FIG. 6A is a schematic exploded perspective view illustrating a display device according to an embodiment of FIG. 1. FIG. 6B is a structural view illustrating a schematic structure of a display module of a display device according to an embodiment of FIG. 1.

Referring to FIGS. 6A and 6B, the display device 1 according to an embodiment may include a display module DM and a set member SET. The display module DM may include an upper protective film PL, a window 1100, a first adhesive member AD1, a display panel PNL, a panel lower member PF and a lower module SM. The lower module SM may include a barrier member CP, a panel support SS, a second adhesive member AD2, a digitizer DZ, a metal support MP, a buffer member CS and a third adhesive member AD3. In claims, based on one element, one side or a side in the third direction DR3 may be referred to as an 'upper', and the other side in the third direction DR3 may be referred to as a 'lower'.

The set member SET may serve to accommodate the display module DM. Although not shown, the set member SET may further include a hinge structure to facilitate folding or bending. A detailed description of the set member SET will be described later in conjunction with FIGS. 13 and 14.

The first flat portion PP1, the first bending portion BP1 and the second flat portion PP2 of the display device 1 may be equally applied to the display module DM, for example, the upper protective film PL, the window 1100, the first adhesive member AD1, the display panel PNL, the panel lower member PF, the barrier member CP, the panel support SS, the second adhesive member AD2, the digitizer DZ, the metal support MP and the buffer member CS. For example, a portion of the display panel PNL, which overlaps the first flat portion PP1 of the display device 1 in the third direction DR3, may be a first flat portion of the display panel PNL, a portion of the display panel PNL, which overlaps the first bending portion BP1 of the display device 1 in the third direction DR3, may be a first bending portion of the display panel PNL, and a portion of the display panel PNL, which overlaps the second flat portion PP2 of the display device 1 may be a second flat portion of the display panel PNL.

Likewise, the first display area DA1, the first non-display area NDA1, the second display area DA2 and the second non-display area NDA2 of the display device 1 may be equally applied to the upper protective film PL, the window 1100, the first adhesive member AD1, the display panel PNL, the panel lower member PF, the barrier member CP, the panel support SS, the second adhesive member AD2, the digitizer DZ, the metal support MP and the buffer member CS.

The upper protective film PL may serve to perform at least one function of anti-scattering, shock absorption, anti-scratch, or anti-glare of the window 1100, which will be described later. The upper protective film PL may be disposed on one side or a side (hereinafter, referred to as "front surface") of the window 1100 in the third direction DR3. The upper protective film PL may be attached to the front surface of the window 1100 through an adhesive member such as, for example, a pressure-sensitive adhesive.

The window 1100 may protect the display panel PNL, which will be described later, from the outside. The window 1100 may be disposed on one side or a side (hereinafter, referred to as 'front surface') of a polarization member POL in the third direction DR3. The window 1100 may be made of a transparent material, for example, glass or plastic. In detail, the window 1100 may be a thin film glass or a transparent polyimide film, which has a width (hereinafter, referred to as 'thickness') of 0.3 mm or less in the third direction DR3. The window 1100 may include a first flat panel part 1110 that overlaps the first flat portion PP1, a second flat panel part 1150 that overlaps the second flat portion PP2, and a first segment part 1130 that overlaps the first bending portion BP1 (see FIG. 7). These portions will be described later.

The window 1100 may be attached to the front surface of the polarization member POL by the first adhesive member AD1. The first adhesive member AD1 may be a transparent adhesive film or a transparent adhesive resin.

The polarization member POL may polarize light emitted from the display panel PNL or polarize the light incident upon the display panel PNL. The polarization member POL may be disposed on one side or a side (hereinafter, referred to as "front surface") of the display panel PNL in the third direction DR3.

The polarization member POL may be omitted depending on an embodiment. In case that the polarization member POL is omitted, the window 1100 may be attached onto the front surface of the display panel PNL by the first adhesive member AD1.

The display panel PNL is a panel that displays a screen, and all types of display panels such as an organic light emitting display panel including an organic light emitting layer, a micro light emitting diode (LED) display panel using a micro LED, a quantum dot light emitting display panel using a quantum dot light emitting diode including a quantum dot light emitting layer or an inorganic light emitting display panel using an inorganic light emitting diode including an inorganic semiconductor may be applied to the display panel PNL of an embodiment. Based on FIG. 1, the display panel PNL may display a screen on one side or a side in the third direction DR3.

The panel lower member PF may serves to support the display panel PNL and protect a rear surface of the display panel PNL. The panel lower member PF may be disposed on the other side (hereinafter, referred to as "rear surface") of the display panel PNL in the third direction DR3. The panel lower member PF may be a plastic such as polyethylene terephthalate or polyimide. Although FIG. 6B illustrates that the panel lower member PF is disposed on the first bending portion BP1 of the display device 1, the embodiments of the disclosure are not limited thereto. For example, in order to smoothly fold the display device 1, the panel lower member PF may be removed from the first bending portion BP1 of the display device 1, and may be disposed only on the first flat portion PP1 and the second flat portion PP2.

The lower module SM may be disposed below the panel lower member PF. As described above, the lower module SM may include a barrier member CP, a panel support SS, a second adhesive member AD2, a digitizer DZ, a metal support MP, a buffer member CS, and a third adhesive member AD3.

The barrier member CP may be disposed on the other side (hereinafter, referred to as 'rear surface') of the panel lower member PF in the third direction DR3. The barrier member CP may include at least one of a light shielding layer for absorbing light incident from the outside, a buffer layer for absorbing impact from the outside, and a heat dissipation layer for efficiently emitting heat of the display panel PNL.

The light shielding layer prevents the elements disposed below the light shielding layer, for example, the digitizer DZ, which will be described later, from being visible on the front surface of the display panel PNL, by preventing light from being transmitted. The light shielding layer may include a light absorbing material such as a black pigment or a black dye.

The buffer layer absorbs external shock to prevent the display panel PNL from being damaged. The buffer layer may be comprised of a single layer or layers. For example, the buffer layer may be formed of a polymer resin such as polyurethane, polycarbonate, polypropylene, and polyethylene, or may include a material having elasticity such as rubber, urethane-based material or sponge foam-molded from an acrylic-based material.

The heat dissipation layer may include a first heat dissipation layer including graphite or carbon nanotubes, and a second heat dissipation layer formed of a metal thin film such as copper, nickel, ferrite and silver, which may shield electromagnetic waves and have excellent thermal conductivity.

The panel support SS may serve to support the rear surface of the display panel PNL. The panel support SS is formed on the other side (hereinafter, referred to as 'rear surface') of the barrier member CP in the third direction DR3. The panel support SS may be a rigid member that is not readily changed in shape or volume due to a pressure from the outside.

The panel support SS may include a lattice pattern that is disposed to overlap the first bending portion BP1 so as to be readily bent from the first bending portion BP1.

The digitizer DZ may include a first digitizer member DZ_1 and a second digitizer member DZ_2. The first digitizer member DZ_1 and the second digitizer member DZ_2 may be disposed on the other side (hereinafter, referred to as 'rear surface') of the panel support SS in the third direction DR3. The first digitizer member DZ_1 and the second digitizer member DZ_2 may be attached to the rear surface of the panel support SS by the second adhesive member AD2. The second adhesive member AD2 may be a pressure sensitive adhesive.

The first digitizer member DZ_1 and the second digitizer member DZ_2 may not be disposed in the first bending portion BP1 to reduce folding stress of the display device 1. The first digitizer member DZ_1 may be disposed to overlap the first flat portion PP1, and the second digitizer member DZ_2 may be disposed to overlap the second flat portion PP2. A gap between the first digitizer member DZ_1 and the second digitizer member DZ_2 may overlap the first bending portion BP1, and may be smaller than the width of the first bending portion BP1 in the second direction DR2.

The first digitizer member DZ_1 and the second digitizer member DZ_2 may include electrode patterns for sensing access or contact of an electronic pen, such as a stylus pen, which supports an electromagnetic induction scheme. The first digitizer member DZ_1 and the second digitizer member DZ_2 may sense a magnetic field or electromagnetic signal emitted from the electronic pen based on the electrode patterns, and may determine a point where the sensed magnetic field or electromagnetic signal is the greatest, as a touch coordinate.

A magnetic metal powder may be disposed on the rear surface of the first digitizer member DZ_1 and the rear surface of the second digitizer member DZ_2. The magnetic field or electromagnetic signal that has passed through the first digitizer member DZ_1 and the second digitizer member DZ_2 may flow into the magnetic metal powder. Therefore, due to the magnetic metal powder, emission of the magnetic field or electromagnetic signal of the first digitizer member DZ_1 and the second digitizer member DZ_2 to the rear surface of the display device 1 may be reduced.

The metal support MP may serve to support the digitizer DZ. The metal support MP may include a first metal support member MP_1 and a second metal support member MP_2. The first metal support member MP_1 may be disposed on the other side (hereinafter, referred to as 'rear surface') of the first digitizer member DZ_1 in the third direction DR3, and the second metal support member MP_2 may be disposed on the other side (hereinafter, referred to as 'rear surface') of the second digitizer member DZ_2 in the third direction DR3.

The first metal support member MP_1 and the second metal support member MP_2 may not overlap the first bending portion BP1 to reduce folding stress of the display device 1. In other words, the first metal support member MP_1 may be disposed to overlap the first flat portion PP1, and the second metal support member MP_2 may be disposed to overlap the second flat portion PP2. A gap between the first metal support member MP_1 and the second metal support member MP_2 may overlap the first bending portion BP1, and may be smaller than the width of the first bending portion BP1 in the second direction DR2.

The first metal support member MP_1 and the second metal support member MP_2 may include a material having high rigidity. For example, the first metal support member MP_1 and the second metal support member MP_2 may include stainless steel such as SUS316.

The buffer member CS may include a first buffer member CS_1 and a second buffer member CS_2. The first buffer member CS_1 and the second buffer member CS_2 absorb external shock to prevent the panel support SS and the digitizer DZ member from being damaged. The first buffer member CS_1 and the second buffer member CS_2 may include a material having elasticity such as rubber, urethane-based material or sponge foam-molded from an acrylic-based material.

The first buffer member CS_1 may be disposed on a rear surface of the first metal support member MP_1, and the second buffer member CS_2 may be disposed on a rear surface of the second metal support member MP_2. The first buffer member CS_1 and the second buffer member CS_2 may not be disposed in the first bending portion BP1 to reduce folding stress of the display device 1. The first buffer member CS_1 may be disposed in the first flat portion PP1, and the second buffer member CS_2 may be disposed on the second flat portion PP2. A gap between the first buffer member CS_1 and the second buffer member CS_2 may overlap the first bending portion BP1, and may be smaller than the width of the first bending portion BP1 in the second direction DR2.

The third adhesive member AD3 may serve to prevent moisture or dust from being permeated into the display device 1. The third adhesive member AD3 may be disposed on the other side (hereinafter, referred to as 'rear surface') of the first metal support member MP_1 in the third direction DR3 and the other side (hereinafter, referred to as 'rear surface') of the second metal support member MP_2 in the third direction DR3. The third adhesive member AD3 may be disposed at an edge of the first metal support member MP_1 and an edge of the second metal support member MP_2. The third adhesive member AD3 may be disposed to surround the first buffer member CS_1 and the second buffer member CS_2. The third adhesive member AD3 may include a waterproof tape or waterproof member for attaching a front surface of the set member SET disposed on the rear surface of the buffer member CS and the rear surface of the first metal support member MP_1 or the second metal support member MP_2 with each other.

On the other hand, the third adhesive member AD3 may be disposed to overlap a magnet for maintaining the second state of the display device 1 in the third direction DR3 without surrounding the first buffer member CS_1 and the second buffer member CS_2. The third adhesive member AD3 may serve as a magnetic shielding member shielding magnetism to prevent the digitizer DZ member or the display panel PNL from being affected by the magnetism of the magnet.

The display device 1 according to an embodiment may further include a set member SET (see FIG. 13) for accommodating the display module DM therein as described below. A detailed description of the set member SET will be described later.

Hereinafter, a configuration of window 1100 will be described in detail.

Figure 7:
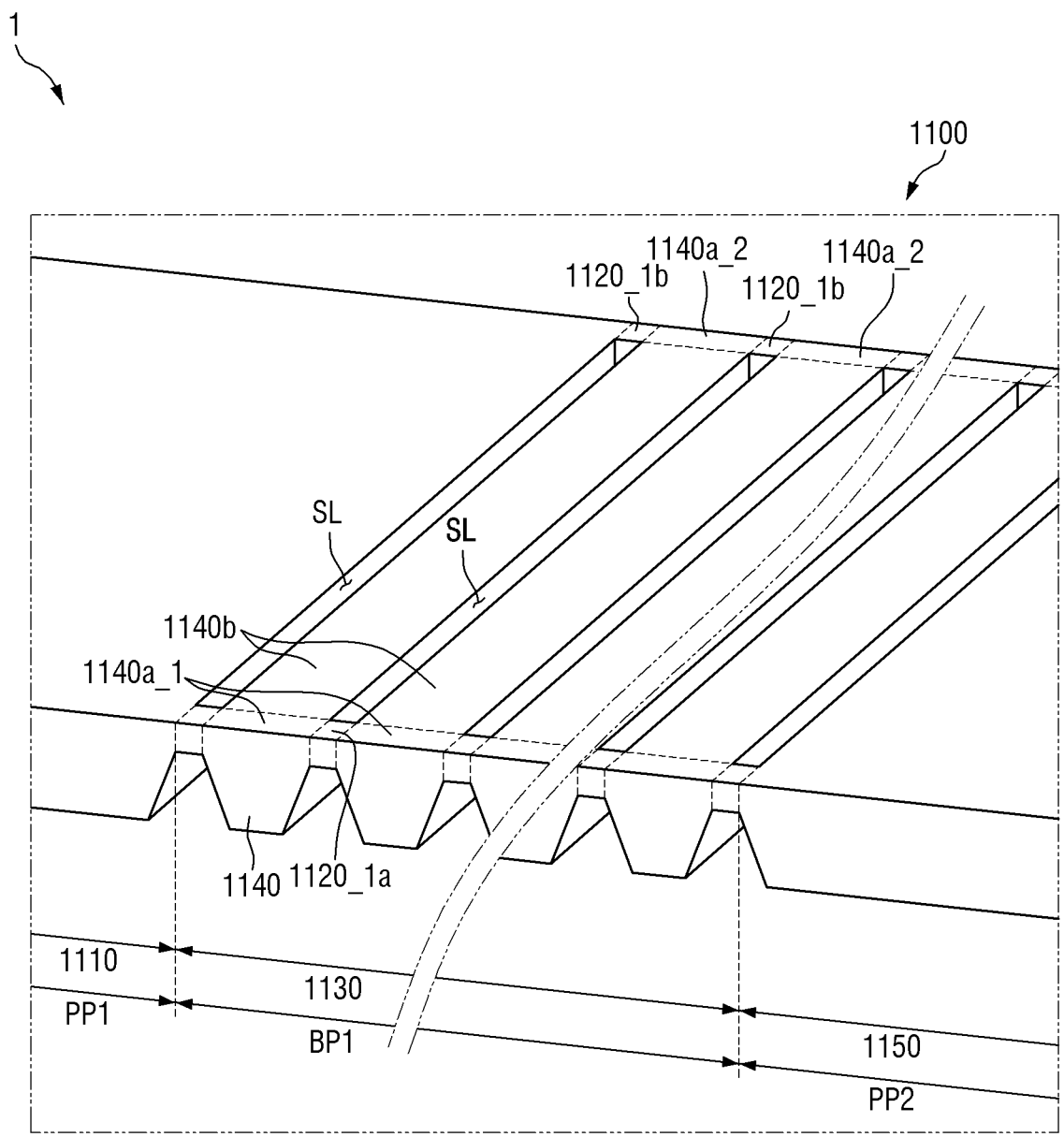
FIG. 7 is a schematic perspective view illustrating a structure of a window of a display device according to an embodiment.
Figure 8:
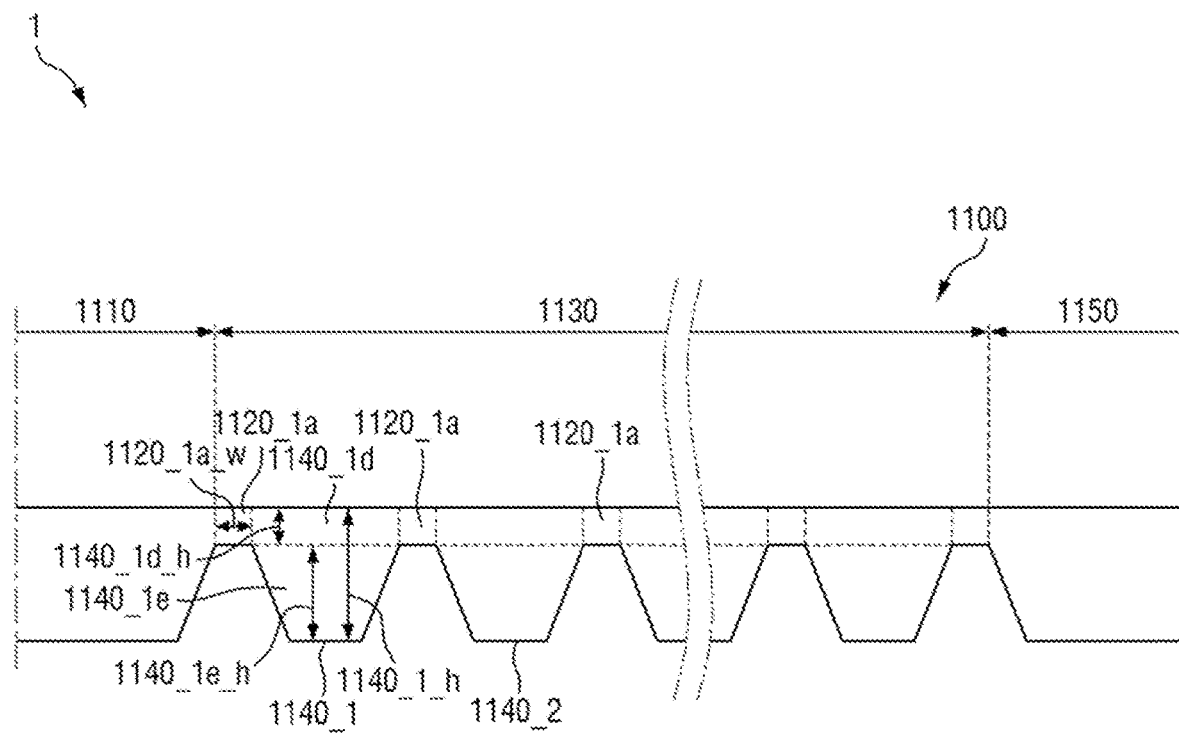
FIG. 8 is a schematic plan view illustrating the window of FIG. 7, which is viewed in a first direction.
Figure 9:
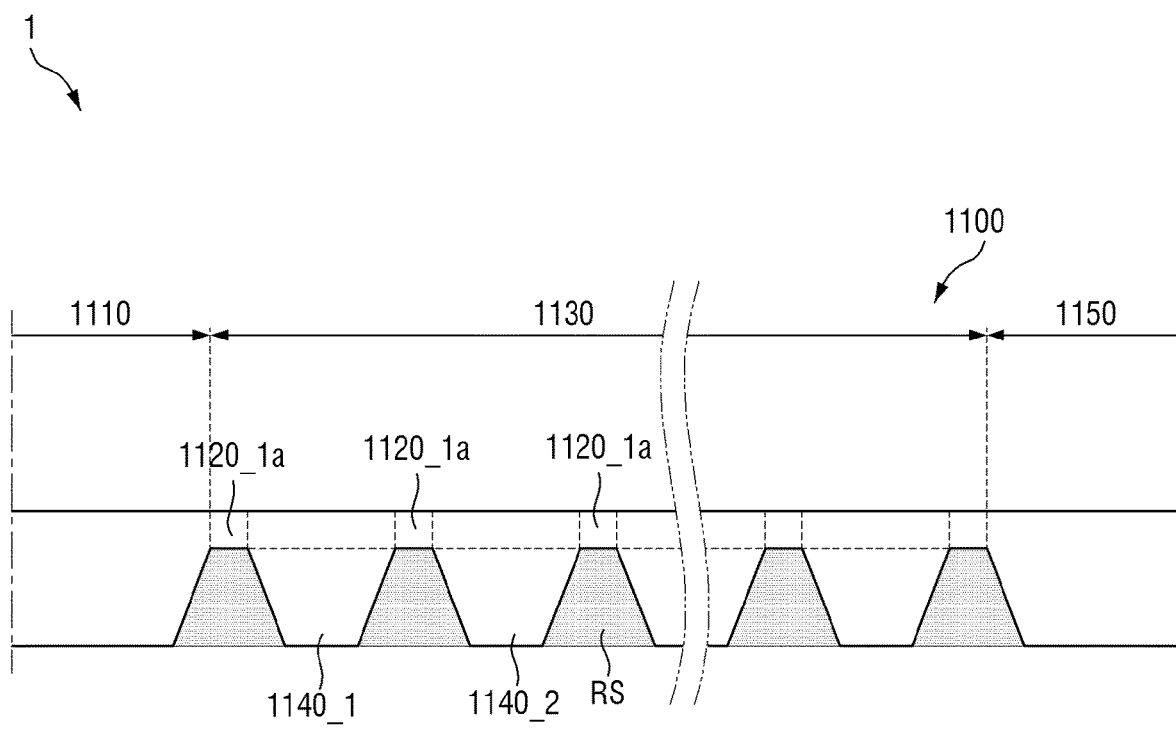
FIGS. 9 and 10 are a schematic plan view and a schematic perspective view illustrating a shape of a window filled with resin.
Figure 10:
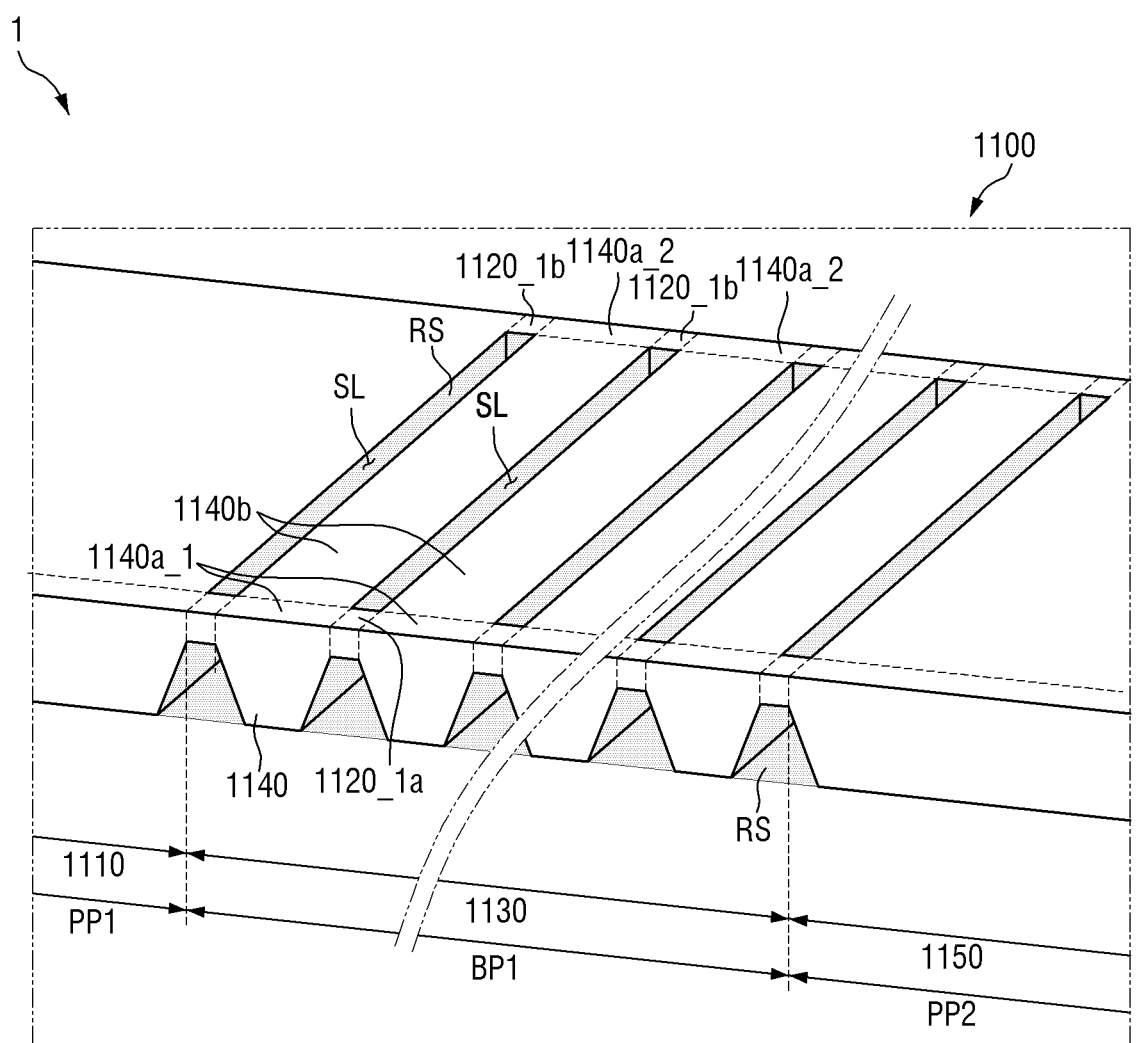
Figure 11:
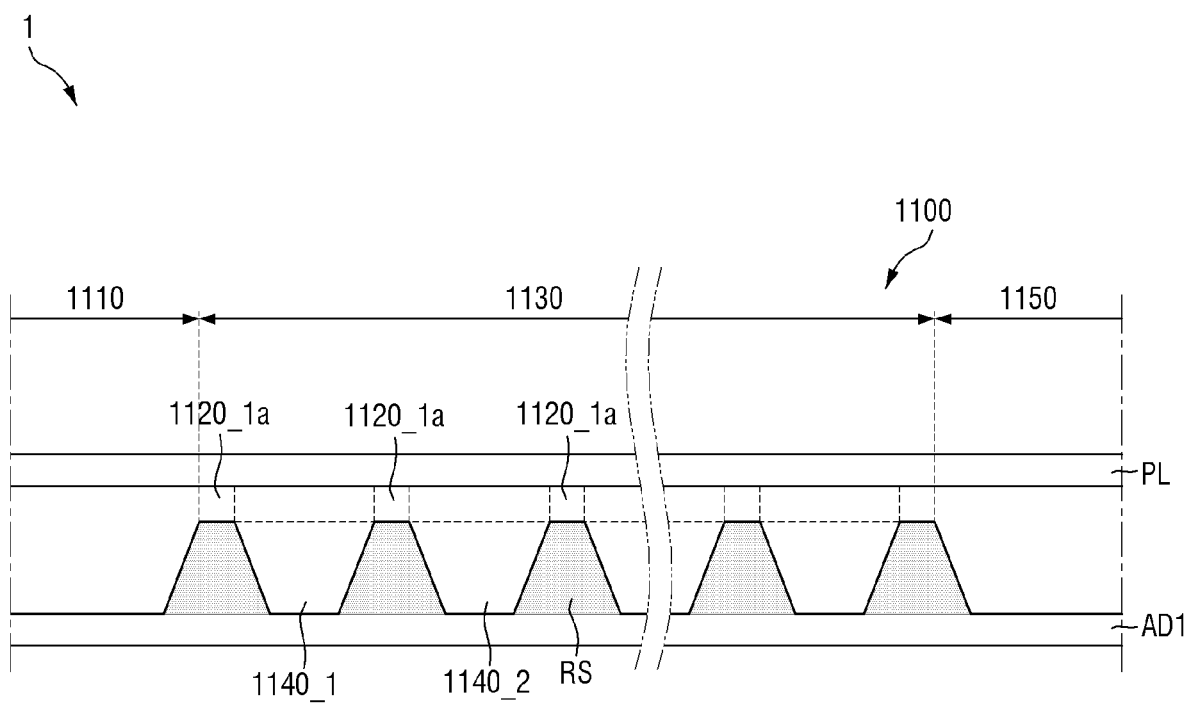
FIG. 11 is a schematic plan view illustrating an arrangement structure of an upper protective film, a window and a first adhesive member.

FIG. 7 is a schematic perspective view illustrating a structure of a window of a display device according to an embodiment of the disclosure. FIG. 8 is a schematic plan view illustrating the window of FIG. 7, which is viewed in a first direction. FIGS. 9 and 10 are a schematic plan view and a schematic perspective view illustrating a shape of a window filled with resin. FIG. 11 is a schematic plan view illustrating an arrangement structure of an upper protective film, a window and a first adhesive member.

Referring to FIGS. 7 and 8, the window 1100 of the display device 1 according to an embodiment may include a first flat panel part 1110 and a second flat panel part 1150, each of which has a planar shape defined in the first direction DR1 and the second direction DR2, and may include a first segment part 1130 disposed between the first flat panel part 1110 and the second flat panel part 1150. In other words, the first segment part 1130 may be disposed on one side or a side of the first flat panel part 1110 in the second direction DR2, and the second flat panel part 1150 may be disposed on one side or a side of the first segment part 1130 in the second direction DR2. The window 1100 may include glass or plastic as described above.

The first flat panel part 1110 may serve to protect the first flat portion PP1 of the display device 1 from the outside. The first flat panel part 1110 may be disposed to overlap the first flat portion PP1 of the window 1100. The first panel part 1110 may overlap the first digitizer member DZ_1 described in FIG. 6B in the third direction DR3, and may overlap first metal support member MP_1 in the third direction DR3. The first flat panel part 1110 may have substantially the same planar shape as that of the first flat portion PP1 of the display device 1.

The second flat panel part 1150 may serve to protect the second flat portion PP2 of the display device 1 from the outside. The second flat panel part 1150 may be disposed to overlap second flat portion PP2 of the window 1100. The second flat panel part 1150 may overlap the second digitizer member DZ_2 described in FIG. 6B in the third direction DR3, and may overlap the second metal support member MP_2 in the third direction DR3. The second flat panel part 1150 may have substantially the same planar shape as that of the second flat portion PP2 of the display device 1.

The first segment part 1130 may serve to protect the first bending portion BP1 of the display device 1 from the outside. The first segment part 1130 may be disposed to overlap the first bending portion BP1 of the window 1100. The first segment part 1130 may be disposed to overlap a space between the first digitizer member DZ_1 and the second digitizer member DZ_2, which are described in FIG. 6B, in third direction DR3, may overlap a space between the first metal support member MP_1 and the second metal support member MP_2 in the third direction DR3. The first segment part 1130 may include segments 1140 extended in the first direction DR1 and spaced apart from each other in the second direction DR2, and bridges 1120 connecting both ends of each of the segments in the first direction DR1.

In case that viewed from the third direction DR3, each of the segments 1140 may include edge portions 1140a positioned at both ends in the first direction DR1 and an inner side portion 1140b positioned between the edge portions 1140a. In detail, each of the segments 1140 may include a first edge portion 1140a_1 positioned at an end of one side or a side in the first direction DR1, a second edge portion 1140a_2 positioned at an end of the other side in the first direction DR1, and an inner side portion 1140b disposed between the first edge portion 1140a_1 and the second edge portion 1140a_2 to connect the first edge portion 1140a_1 with the second edge portion 1140a_2. In an embodiment, in case that viewed from the third direction DR3, the inner side portion 1140b may have a rectangular planar shape connecting the end of the other side of the first edge portion 1140a_1 in the first direction DR1 with the end of one side or a side of the second edge portion 1140a_2 in the first direction DR1, but is not limited thereto. In an embodiment, in case that viewed from the third direction DR3, a width of the inner side portion 1140b in the second direction DR2 may be the same as that of each of the first edge portion 1140a_1 and the second edge portion 1140a_2 in the second direction DR2, but is not limited thereto. The bridges 1120 may connect the first edge portions 1140a_1 with the second edge portions 1140a_2 of each of the segments 1140 so that each of the segments 1140 maintains an interval, and may serve to allow each of the segments 1140 not to be distorted in case that the display device 1 is bent. In other words, the bridges 1120 may include a first bridge 1120_1 for connecting both sides of the first edge portion 1140a_1 and the second edge portion 1140a_2 of each of the segments 1140 in the second direction DR2. In detail, the first bridge 1120_1 may include a (1_1)th bridge 1120_1a connecting both sides of the first edge portion 1140a_1 in the second direction DR2 and a (1_2)th bridge 1120_1b connecting both sides of the second edge portion 1120a_2 in the second direction DR2. The bridges 1120 and the segments 1140 may be integrally formed or integral. In other words, the bridges 1120 and the segments 1140 may include a same material or a similar material. Therefore, in case that the window 1100 may include glass, the bridges 1120 and the segments 1140 may be integrally formed or integral to include glass.

In case that viewed from the third direction DR3, the first bridge 1120_1 may have a flat panel shape having a rectangular planar shape, which has a width in the first direction DR1 and a width in the second direction DR2. In an embodiment, the width of the first bridge 1120_1 in the first direction DR1 may be the same as that of each of the first edge portion 1140a_1 and the second edge portion 1140a_2 in the first direction DR1, but is not limited thereto. For example, a width of the (1_1)th bridge 1120_1a in the first direction DR1 and the width of the first edge portion 1140a_1 in the first direction DR1 may be equal to each other, and a width of the (1_2)th bridge 1120_1b in the first direction DR1 and the width of the second edge portion 1140a_2 in the first direction DR1 may be equal to each other, but are not limited thereto.

The edge portion 1140a of the segments 1140 may overlap the first non-display area NDA1 of the display device 1, and the inner side portion 1140b may overlap the first display area DA1 of the display device 1. Therefore, the first bridge 1120_1 connecting the edge portion 1140a may overlap the first non-display area NDA1 of the display device 1.

As described above, each of the segments 1140 may be connected to each other in the edge portion 1140a by the bridges 1120, and may be spaced apart from each other in the second direction DR2 in the inner side portion 1140b. Therefore, a slit SL defined by a width of the inner side portion 1140b in the first direction DR1 and a width of the first bridge 1120_1 in the first direction DR1, passing through the window 1100 in the third direction DR3 may be formed between the respective segments 1140.

The segments 1140 may include a first segment 1140_1 and a second segment 1140_2 adjacent to the first segment 1140_1. The segments 1140 may have a configuration in which the first segment 1140_1 and the second segment 1140_2 are repeated. Since the configurations and shapes of the first segment 1140_1 and the second segment 1140_2 are substantially the same as each other, the description will be based on the first segment 1140_1, and the description of the second segment 1140_2 will be described or omitted.

Each of the segments 1140 may have a shape in which the width in the second direction DR2 is reduced in a direction toward the other side in the third direction DR3, for example, toward the display panel PNL, based on FIG. 8. In detail, in case that viewed from the first direction DR1, the first segment 1140_1 of the segments 1140 may have an upper portion 1140_1d having a rectangular-shaped planar shape and a lower portion 1140_1e having a trapezoidal-shaped planar shape in which the width in the second direction DR2 is reduced in a direction toward the display panel PNL. Therefore, a width 1140_1_h (hereinafter, referred to as 'thickness') of the first segment 1140_1 in the third direction DR3 may be defined as a sum of a width 1140_1d_h (hereinafter, referred to as 'thickness') of the upper portion 1140_1d of the first segment 1140_1 in the third direction DR3 and a width 1140_1e_h (hereinafter, referred to as 'thickness') of the lower portion 1140_1e of the first segment 1140_1 in the third direction DR3. The thickness 1140_1_h of the first segment 1140_1 may be about 0.3 mm or less. Also in case that viewed from the first direction DR1, the second segment 1140_2 of the segments 1140 may have an upper portion 1140_2d having a rectangular-shaped planar shape and a lower portion 1140_2e having a trapezoidal-shaped planar shape in which the width in the second direction DR2 is reduced in a direction toward the display panel PNL. Therefore, a width (hereinafter, referred to as 'thickness') of the second segment 1140_2 in the third direction DR3 may be defined as a sum of a width (hereinafter, referred to as 'thickness') of the upper portion 1140_2d of the second segment 1140_2 in the third direction DR3 and a width (hereinafter, referred to as 'thickness') of the lower portion 1140_2e of the second segment 1140_2 in the third direction DR3. The thickness of the second segment 1140_2 may be about 0.3 mm or less.

As the width (hereinafter, referred to as 'thickness') of the first bridge 1120_1 in the third direction DR3 becomes thinner, bending performance of the first bridge 1120_1 may be increased. The thickness of the first bridge 1120_1 may be the same as the thickness 1140_1d_h of the upper portion 1140_1d of the first segment 1140_1. In case that the thickness of the first bridge 1120_1 is greater than or equal to about 100 µm, bending may not be facilitated. Even though bending is facilitated, since the first bridge 1120_1 may be broken by its rigidity, the thickness of the first bridge 1120_1 may be less than about 100 µm. In case that the thickness of the first bridge 1120_1 is less than about 20 µm, rigidity of the first bridge 1120_1 is weak and thus may be broken while being bent. Therefore, the thickness of the first bridge 1120_1 and the thickness 1140_1d_h of the upper portion 1140_1d of the first segment 1140_1 may be in a range of about 20 µm to about 100 µm, and for example in a range of about 20 µm to about 50 µm.

The width of the first bridge 1120_1 in the second direction DR2 may be substantially the same as the spaced distance of the respective segments 1140. In detail, a minimum spaced distance of the respective segments 1140 in the first state that the display device 1 is not bent may be substantially the same as the width of the first bridge 1120_1 in the second direction DR2. On the other hand, in an embodiment, the width of the first bridge 1120_1 in the second direction DR2 may be the same as a width 1120_1a_w of the (1_1)th bridge 1120_1a in the second direction DR2 and the width 1120_1a_w of the first bridge 1120_1a in the second direction DR2 may be the same as the thickness 1140_1d_h of the upper portion 1140_1d of the first segment 1140_1, but they are not limited thereto. The width 1120_1a_w of the (1_1)th bridge 1120_1a in the second direction DR2 and the thickness 1140_1d_h of the upper portion 1140_1d of the first segment 1140_1 may be in a range of about 20 µm to about 100 µm, and for example in a range of about 20 µm to about 50 µm, as described above.

Referring to FIGS. 9 to 11, a curing resin RS may be filled in the space where the respective segments 1140 are spaced apart from each other. The curing resin RS may serve to prevent the first segment part 1130 of the window 1100 from being visible to a user. The curing resin RS may fill a gap space formed between lower portions of the respective segments 1140 and a gap space formed by the slit SL so that the window 1100 may be visible as a flat panel. Therefore, the curing resin RS may have a refractive index adjusted depending on areas of the window 1100, thereby providing reflect index matching. In an embodiment, the curing resin RS may be a UV curing resin, but is not limited thereto.

As the curing resin RS is filled in the space where the respective segments 1140 are spaced apart from each other, the upper protective film PL disposed on the front surface of the window 1100 and the first adhesive member AD1 disposed on the rear surface of the window 1100 may be more effectively attached to the window 1100.

On the other hand, as the curing resin RS filled between the bridges 1120 and the segments 1140 is pressurized by the bridges 1120 and the edge portions 1140a of the segments 1140 while the display device 1 is being bent, its refractive index is varied, whereby the bridges 1120 and the segments 1140 may be visible to the user. Therefore, in order to prevent the bridges 1120 and the segments 1140 from being visible to the user due to the change of the refractive index of the curing resin RS filled between the bridges 1120 and the segments 1140 while the display device is being bent, it is required to cover the bridges 1120 and the edge portions 1140a of the segments 1140. Hereinafter, an arrangement structure of a bracket, which is a component for covering the bridges 1120 and the edge portions 1140a of the segments 1140, and an arrangement structure of the set member will be described.

Figure 12:
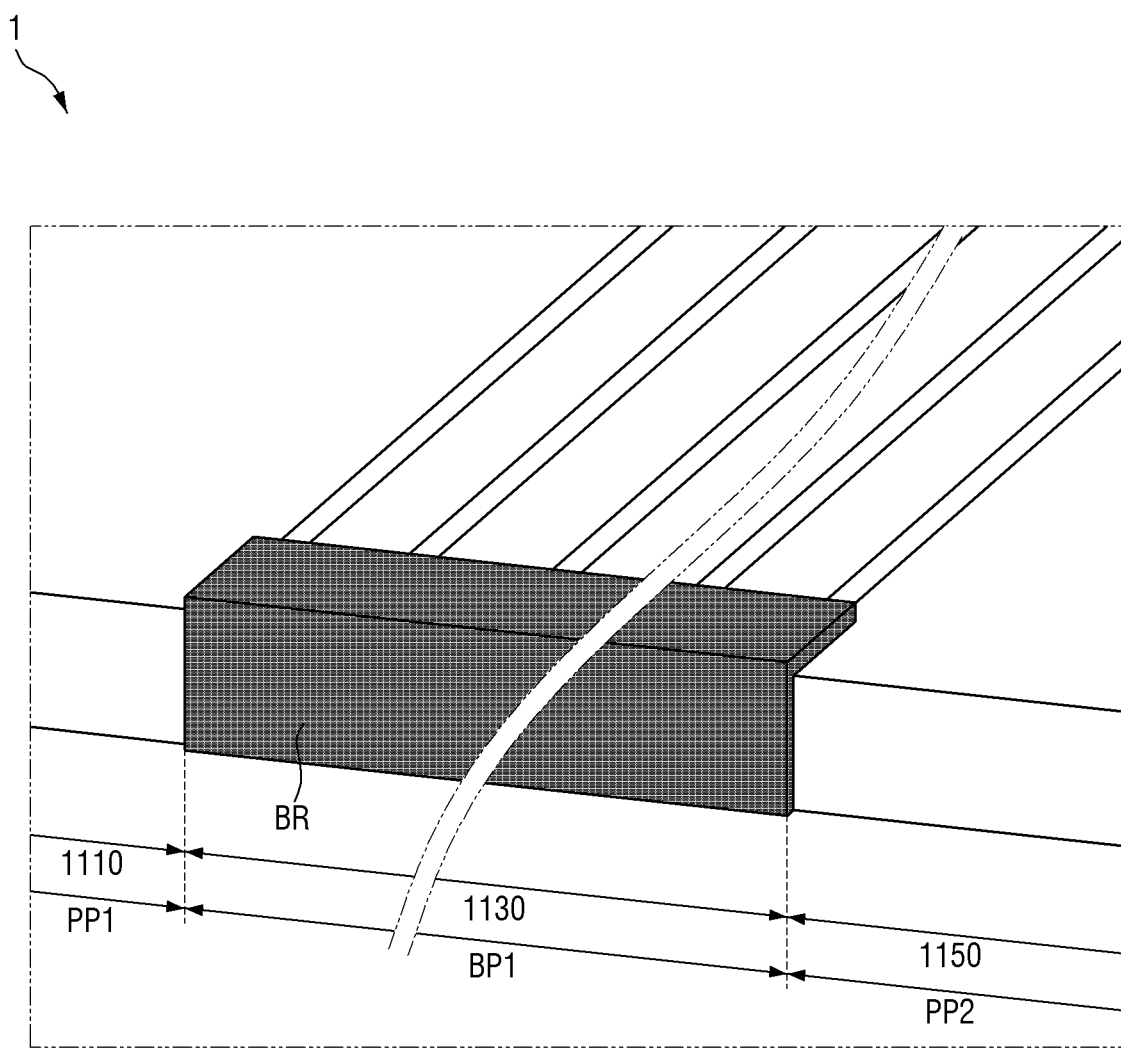
FIG. 12 is a schematic perspective view illustrating an arrangement structure of a window and a bracket of a display device according to an embodiment of FIG. 7.
Figure 13:
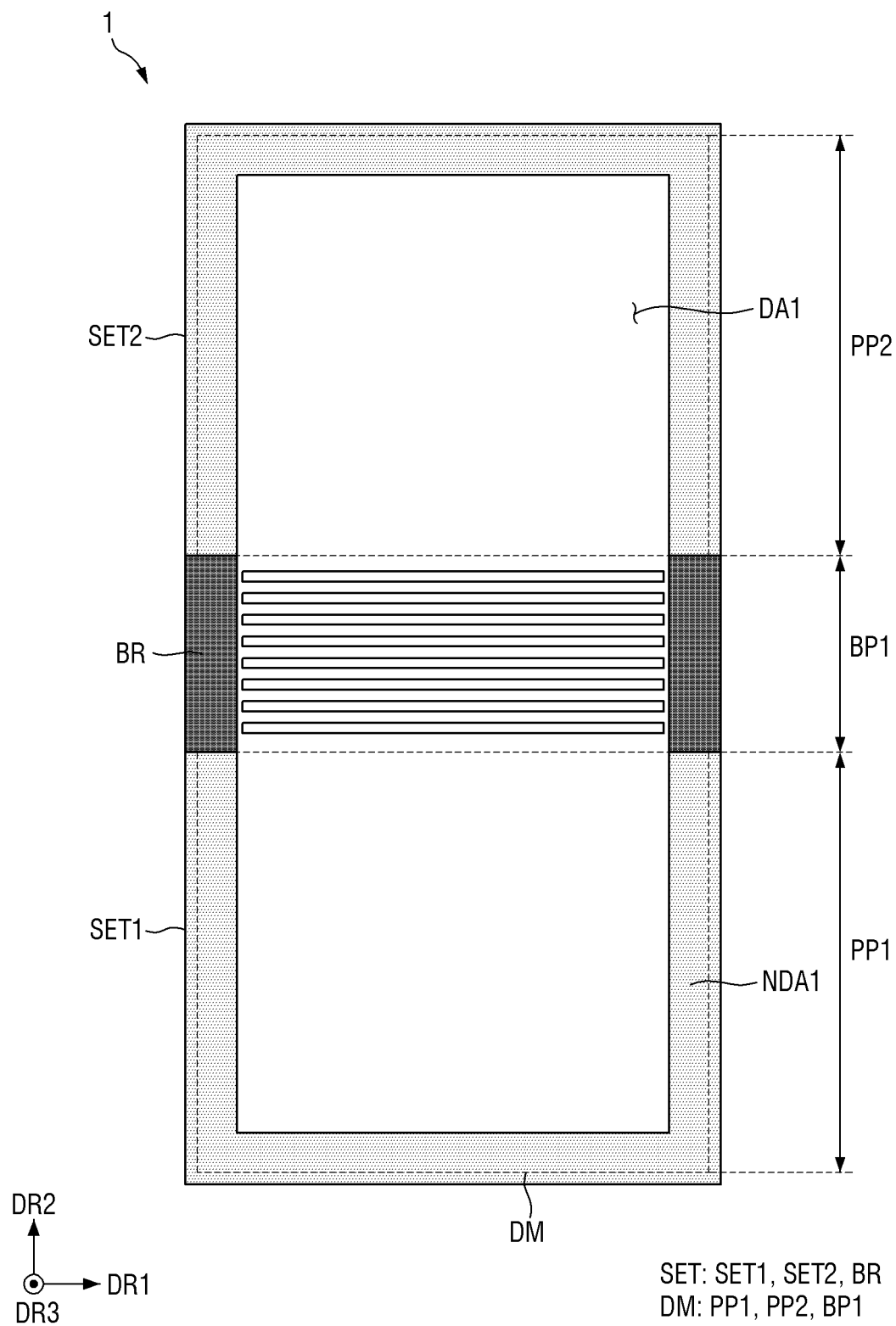
FIGS. 13 and 14 are schematic plan views illustrating an arrangement structure of a display module and a set member according to an embodiment of FIG. 7.
Figure 14:
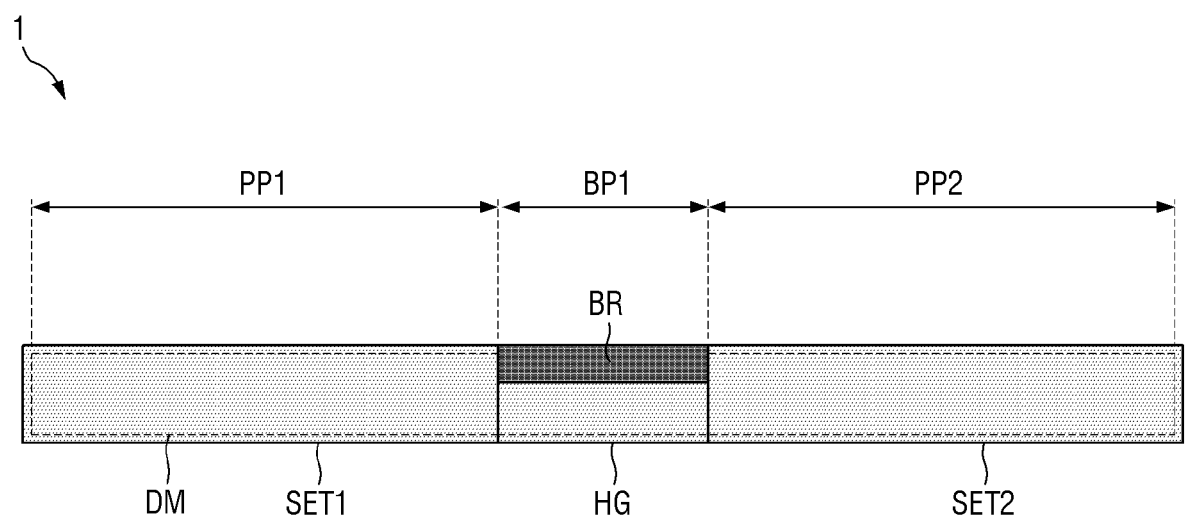

FIG. 12 is a schematic perspective view illustrating an arrangement structure of a window and a bracket of a display device according to an embodiment of FIG. 7. FIGS. 13 and 14 are schematic plan views illustrating an arrangement structure of a display module and a set member according to an embodiment of FIG. 7.

Referring to FIGS. 12 to 14, the set member SET may include a first set member SET1, a second set member SET2, a hinge part HG and a bracket BR. For convenience of description, the elements other than the window 1100 in the display module DM are omitted in FIGS. 12 to 14.

The first set member SET1 may accommodate the display module DM of the display device 1 according to an embodiment therein and serve to protect the display module DM from the outside.

The first set member SET1 may serve to accommodate the first flat portion PP1 of the display module DM. The first set member SET1 may be disposed on the first flat portion PP1 of the display module DM. The first set member SET1 may cover the first display area DA1 and the first non-display area NDA1 of the display module DM.

The second set member SET2 may serve to accommodate the second flat portion PP2 of the display module DM. The second set member SET2 may be disposed in the second flat portion PP2 of the display module DM. The second set member SET2 may cover the first display area DA1 and the first non-display area NDA1 of the display module DM.

The hinge part HG may connect the first set member SET1 with the second set member SET2, and may serve to accommodate the rear surface of the first bending portion BP1 of the display module DM. The hinge part may be disposed between the first set member SET1 and the second set member SET2.

The bracket BR may serve to prevent the bridges 1120 and the segments 1140 from being visible to a user due to the change of the refractive index of the curing resin RS filled between the bridges 1120 and the segments 1140 while the display device 1 is being bent. The bracket BR may be disposed between the first set member SET1 and the second set member SET2, and may be disposed on one side or a side of the hinge part HG in the third direction to overlap the hinge part HG.

The bracket BR may have a shape that covers both ends of the first segment part 1130 of the window 1100 in the first direction DR1. In detail, the bracket BR may have a structure having a '1' shaped planar shape in case that viewed from the second direction DR2 so as to cover the front surface of the edge portion 1140a of each of the segments 1140 and the side of the edge portion 1140a in the first direction DR1 and the front surface of the bridges 1120 and the side of the bridges 1120 in the first direction DR1.

The bracket BR may include a material having flexibility such that it is bent together with the display device 1 in case that the display device 1 is bent from the first bending portion BP1. In an embodiment, the bracket BR may include a polymer material such as polyurethane having flexibility, but is not limited thereto. Also, in an embodiment, the bracket BR may have a black color to be prevented from being visible to a user due to the change of the refractive index of the curing resin RS, but is not limited thereto.

In the display device 1 according to an embodiment as above, bending performance of the window 1100 is improved, the segments 1140 are mutually maintained at constant intervals and are not distorted, whereby device reliability may be improved. The bridges 1120 and the segments 1140 may be prevented from being visible to a user due to the change of the refractive index of the curing resin RS filled between the bridges 1120 and the segments 1140 while the display device 1 is being bent.

Hereinafter, other embodiments of the display device 1 will be described. In the following embodiments, the same reference numerals will be given to the same elements as those of the previously described embodiment, the repeated description will be omitted or simplified, and the following description will be based on a difference from the previous embodiment.

Figure 15:
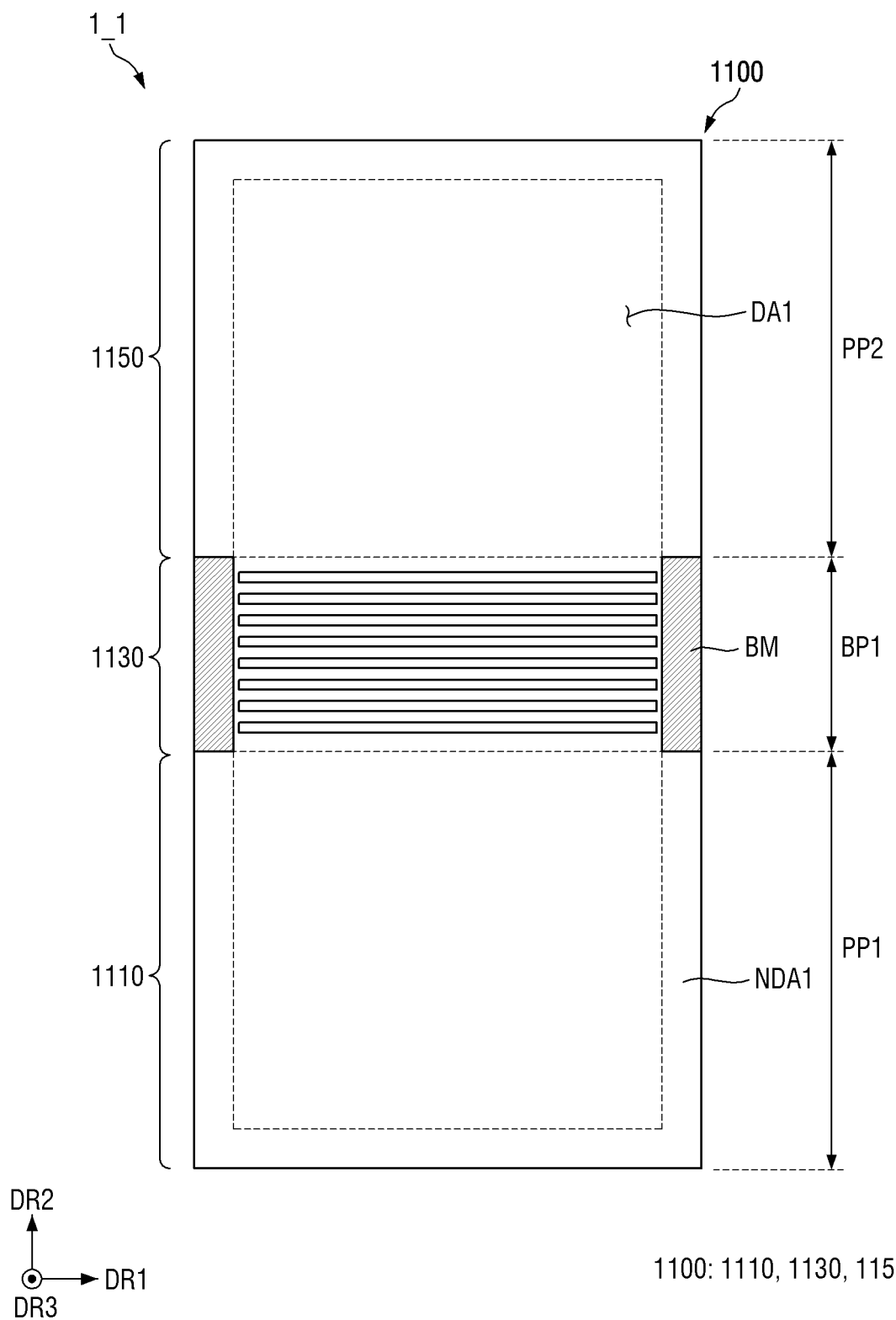
FIGS. 15 and 16 are schematic plan views illustrating a structure of a window of a display device according to an embodiment.
Figure 16:
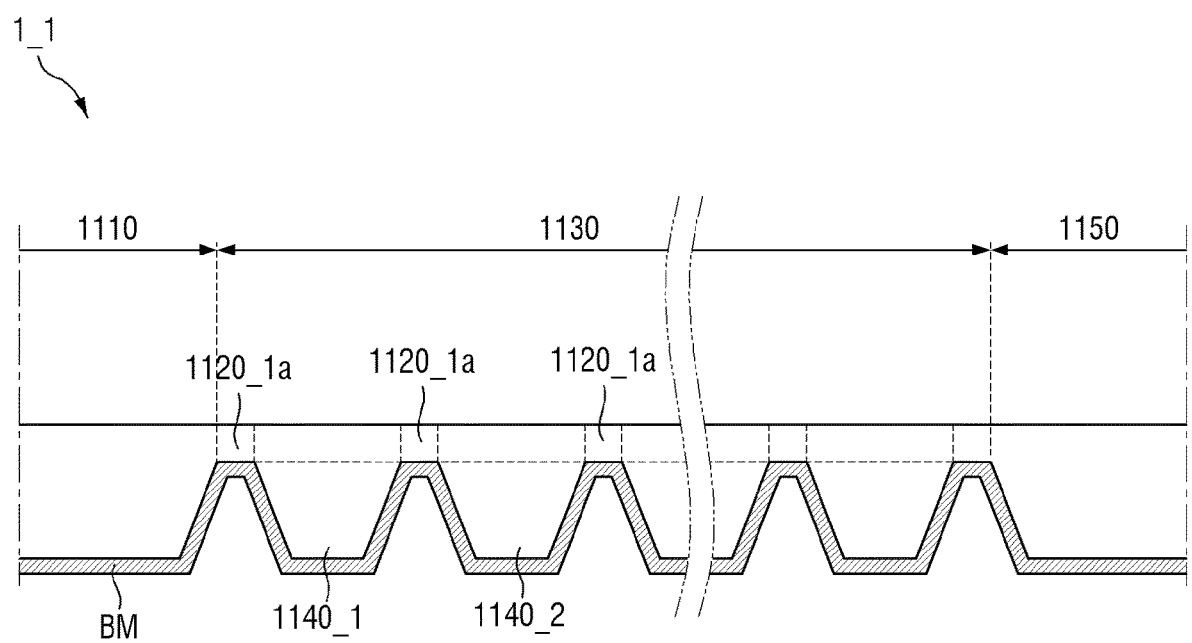
Figure 17:
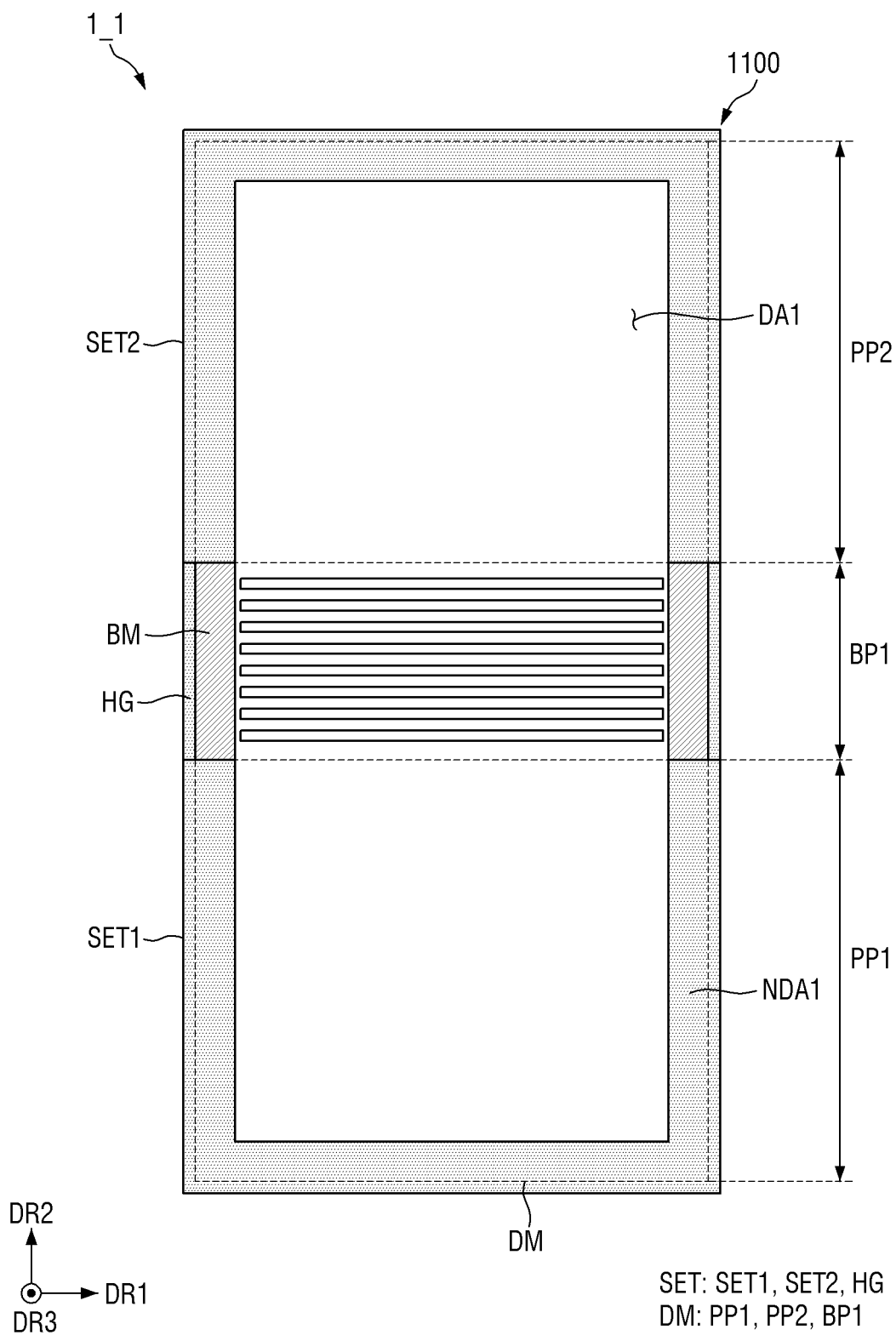
FIG. 17 is a schematic plan view illustrating an arrangement structure of a display module and a set member according to an embodiment of FIG. 15.

FIGS. 15 and 16 are schematic plan views illustrating a structure of a window of a display device according to an embodiment. FIG. 17 is a schematic plan view illustrating an arrangement structure of a display module and a set member according to an embodiment of FIG. 15.

Referring to FIGS. 15 to 17, a display module DM of a display device 1_1 according to an embodiment may further include a light shielding pattern BM formed on the rear surface of the window 1100. In detail, in the display device 1_1 according to an embodiment, the bracket BR may be omitted from the set member SET, and the light shielding pattern BM may be added to the rear surface of the window 1100.

The light shielding pattern BM may serve to prevent the bridges 1120 and the segments 1140 from being visible to a user due to the change of the refractive index of the curing resin RS filled between the bridges 1120 and the segments 1140 while the display device 1 is being bent. The light shielding pattern BM may be disposed at the edge of the window 1100 or disposed to be adjacent to the edge of the window 1100. In detail, the light shielding pattern BM may be disposed on the edge portion 1140a of each of the segments 1140 and the rear surface of the bridges 1120 to cover the edge portions 1140a of each of the segments 1140 and the front surface of the bridges 1120. In other words, the light shielding pattern BM may be formed to have substantially the same thickness along a profile of the rear surface of both ends of the first segment part 1130 of the window 1100 in the first direction DR1.

As the light shielding pattern BM is disposed at the edge of the window 1100 or disposed to be adjacent to the edge of the window 1100, a portion of the hinge part HG of the set member SET may be visible. In other words, the light shielding pattern may be disposed between the first set member SET1 and the second set member SET2 and exposed, and a portion of the hinge part HG may be visible on the side of the light shielding pattern BM in the first direction DR1.

The light shielding pattern BM may include a light shielding material shielding light. For example, the light shielding pattern BM may be an inorganic black pigment such as carbon black, an organic black pigment or an opaque metal material.

Therefore, the light shielding pattern BM may prevent the bridges 1120 and the segments 1140 from being visible to a user due to the change of the refractive index of the curing resin RS filled between the bridges 1120 and the segments 1140 while the display device 1 is being bent.

Figure 18:
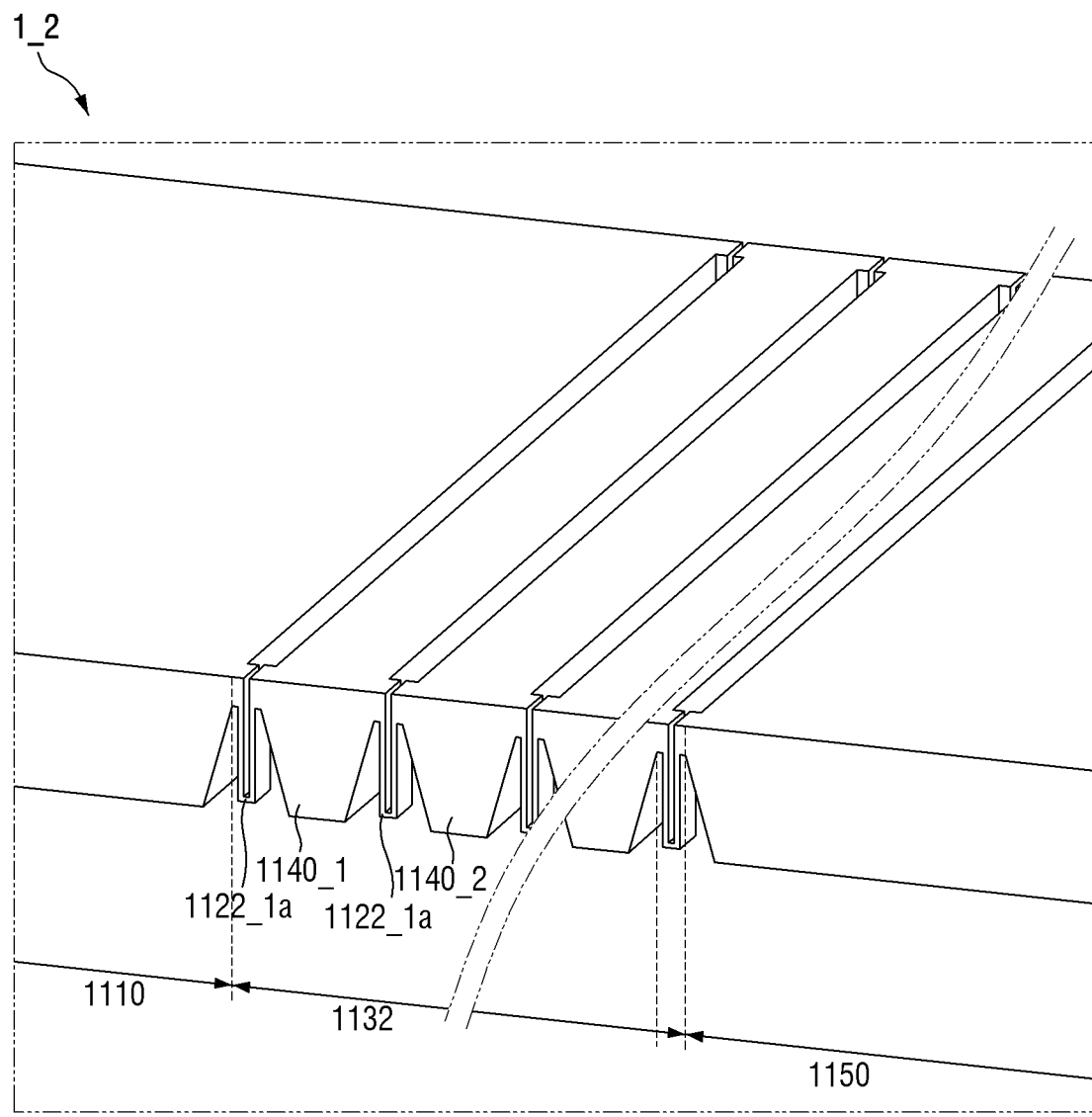
FIG. 18 is a schematic perspective view illustrating a structure of a window of a display device according to an embodiment.
Figure 19:
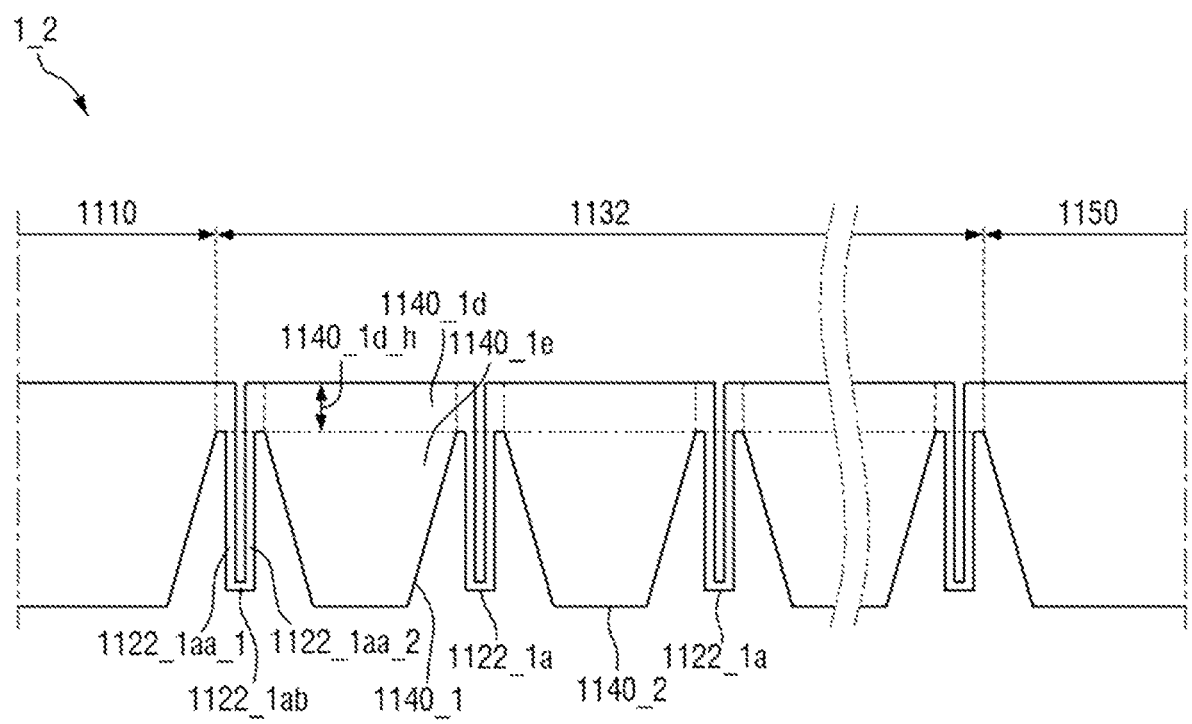
FIG. 19 is a schematic plan view illustrating a structure of a window according to an embodiment of FIG. 18.
Figure 20:
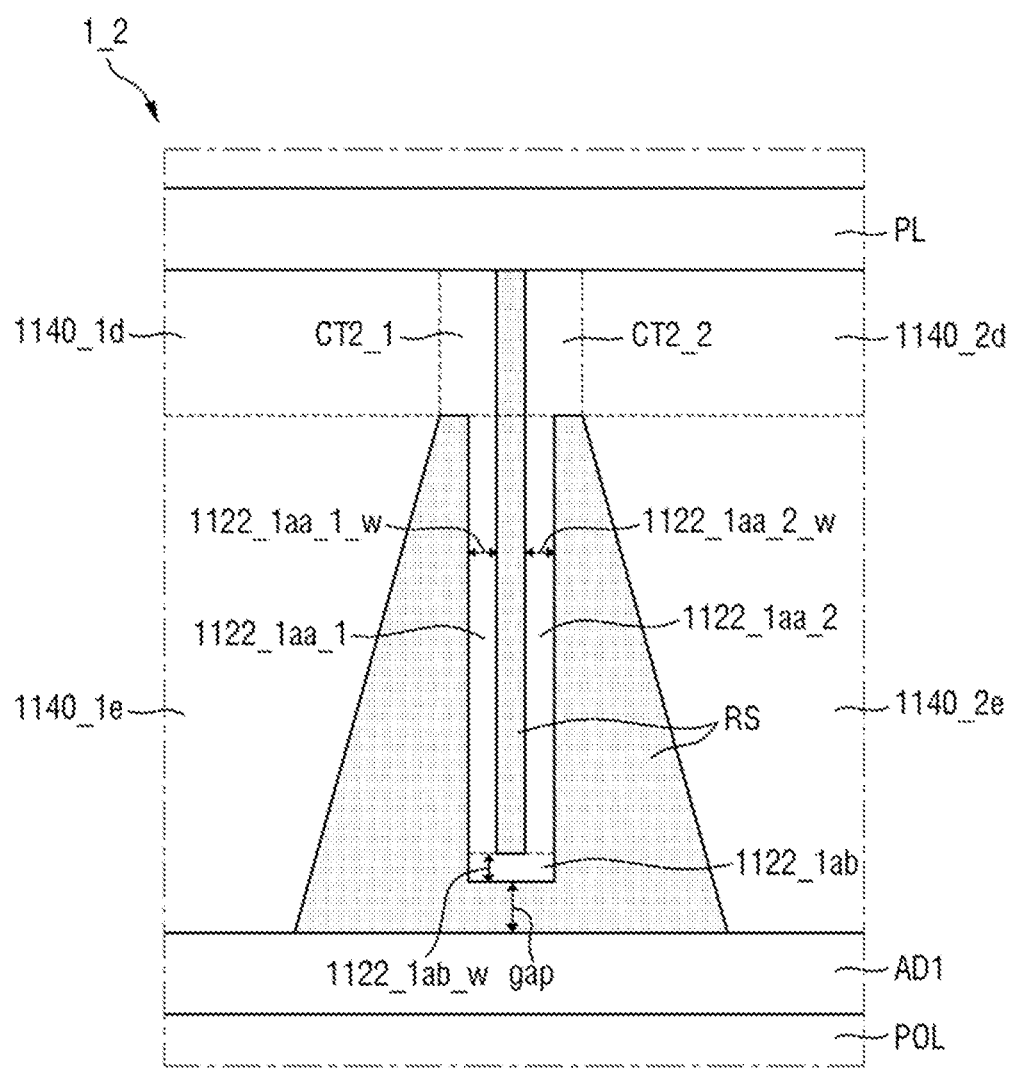
FIG. 20 is a schematic plan view illustrating an arrangement structure of a window according to an embodiment of FIG. 18.

FIG. 18 is a schematic perspective view illustrating a structure of a window of a display device according to an embodiment. FIG. 19 is a schematic plan view illustrating a structure of a window according to an embodiment of FIG. 18. FIG. 20 is a schematic plan view illustrating an arrangement structure of a window according to an embodiment of FIG. 18.

Referring to FIGS. 18 to 20, a first segment part 1132 of a window 1102 of a display device 1_2 according to an embodiment may include bridges which have a curved shape. In detail, the bridges 1122 may have a bent part that is curved toward the other side in the third direction DR3, for example, toward the display panel PNL. As described above, the bridges 1122 include a first bridge 1122_1 for connecting the edge portions 1140a of the respective segments 1140, and shapes and structures of a (1_1)th bridge 1122_1a and a (1_2)th bridge 1122_1b of the first bridge 1122_1 are substantially the same as each other. Therefore, the description will be based on the (1_1)th bridge 1122_1a, and the description of the (1_2)th bridge 1122_1b will be omitted.

The (1_1)th bridge 1122_1a according to an embodiment is disposed between the first segment 1140_1 and the second segment 1140_2 to connect the first segment 1140_1 with the second segment 1140_2. The (1_1)th bridge 1122_1a may include a first connection portion CT2_1 integrally connected to the first segment 1140_1, a first extension portion 1122_1aa extended from the first connection portion CT2_1 and a second connection portion CT2_2 to the other side in the third direction DR3, and a lower end portion 1122_1ab connected to an end of the other side of the first extension portion 1122_1aa in the third direction DR3. In detail, the (1_1)th bridge 1122_1a may include a first connection portion CT2_1 integrally connected to one side or a side or a side of the first segment 1140_1 in the second direction DR2, a (1_1)th extension portion 1122_1aa_1 extended from the first connection portion CT2_1 to the other side or another side in the third direction DR3, a second connection portion CT2_2 integrally connected to the other side or another side of the second segment 1140_2 in the second direction DR2, a (1_2)th extension portion 1122_1aa_2 extended from the second connection portion CT2_2 to the other side in the third direction DR3, and a lower end portion 1122_1ab connecting an end of the other side of the (1_1)th extension portion 1122_1aa_1 in the third direction DR3 with an end of the other side of the (1_2)th extension portion 1122_1aa_2 in the third direction DR3. The (1_1)th extension portion 1122_1aa_1, the (1_2)th extension portion 1122_1aa_2 and the lower end portion 1122_1*ab* form the bent part of the (1_1)th bridge 1122_1*a*. Therefore, the (1_1)th bridge 1122_1*a* may have a shape similar to 'U' in case that viewed from the first direction DR1.

A width 1122_1*aa*_1_w of the (1_1)th extension portion 1122_1*aa*_1 of the (1_1)th bridge 1122_1*a* in the second direction DR2, a width 1122_1*aa*_2_w of the (1_2)th extension portion 1122_1*aa*_2 in the second direction DR2 and a width 1122_1*ab*_w of the lower end portion 1122_1*ab* in the third direction DR3 may be substantially the same as one another. In other words, the (1_1)th bridge 1122_1*a* may have a shape in which a flat panel of a thickness is bent and curved toward the other side in the third direction DR3, for example, toward the display panel PNL. The width 1122_1*aa* w of the (1_1)th extension portion 1122_1*aa*_1 in the second direction DR2, the width 1122_1*aa*_2_w of the (1_2)th extension portion 1122_1*aa*_2 in the second direction DR2 and the width 1122 lab w of the lower end portion 1122_1*ab* in the second direction DR2 may be in a range of about 20 µm to about 50 µm. The bending characteristics of the (1_1)th bridge 1122_1*a* may be improved by the above configuration, whereby bending of the (1_1)th bridge 1122_1*a* may be more facilitated.

A curing resin RS may be filled in a gap space between the (1_1)th extension portion 1122_1*aa*_1 and the (1_2)th extension portion 1122_1*aa*_2 and a gap space between the first segment 1140_1 and the second segment 1140_2 as the outside of the bent part.

The lower end portion 1122_1*ab* may be the lowermost end portion of the (1_1)th bridge 1122_1*a*. The lower end portion 1122_1*ab* may form a gap space formed by being spaced apart from the first adhesive member AD1 in the third direction DR3. In other words, the lower end portion 1122_1*ab* may be spaced apart from the first adhesive member AD1 in the third direction DR3 with the curing resin RS interposed therebetween. Therefore, since the lower end portion 1122_1*ab* is not attached to the first adhesive member AD1, the (1_1)th bridge 1122_1*a* may be more freely bent.

Figure 21:
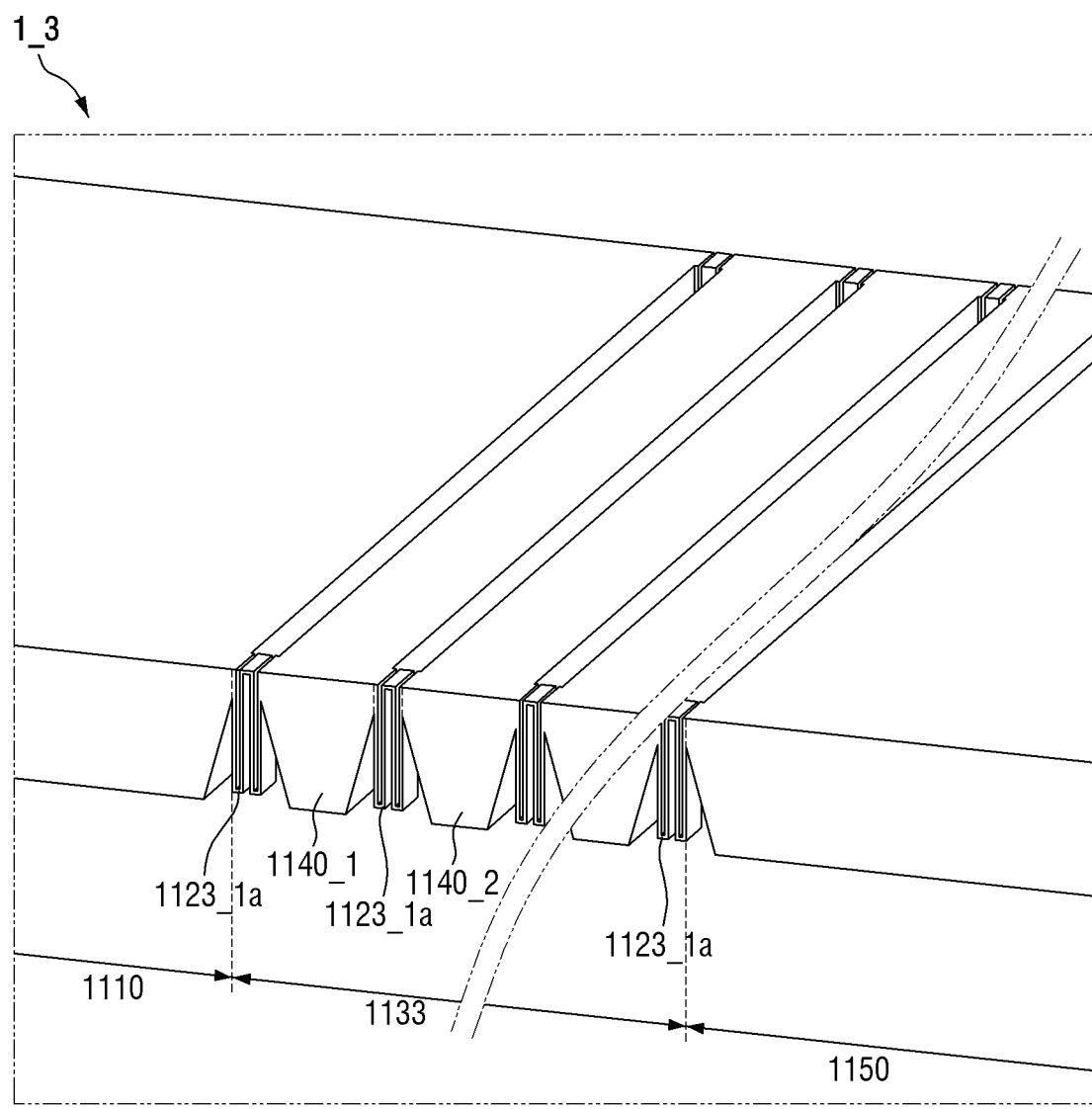
FIG. 21 is a schematic perspective view illustrating a structure of a window of a display device according to an embodiment.
Figure 22:
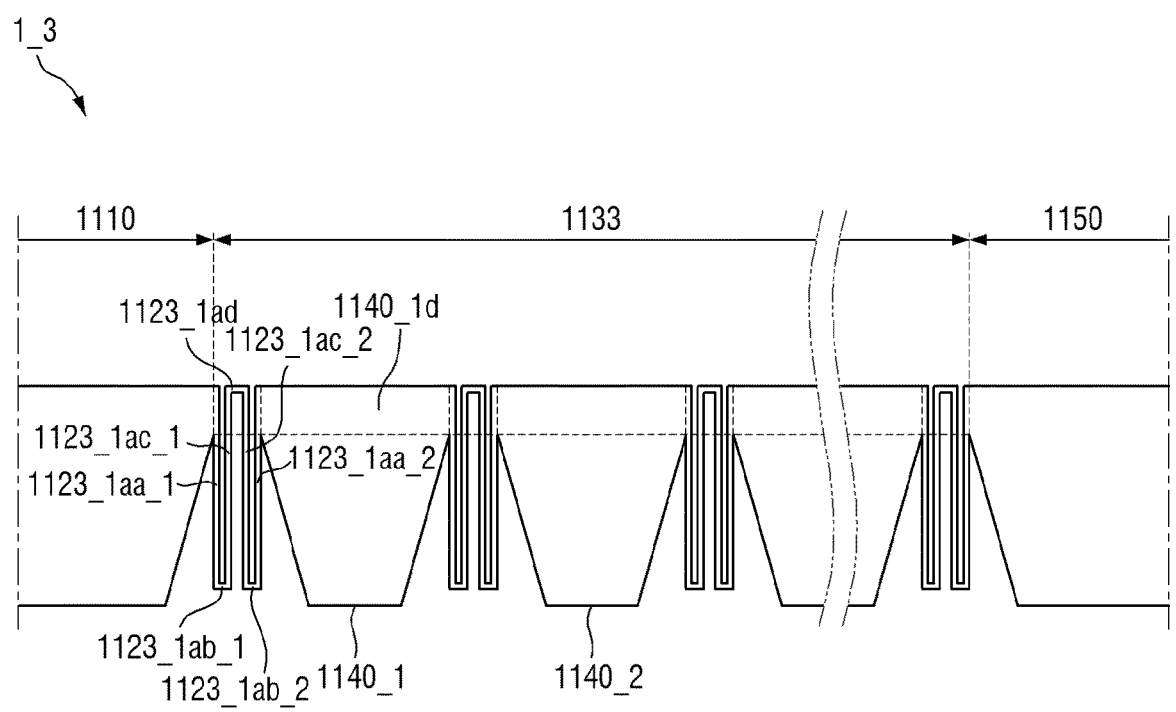
FIG. 22 is a schematic perspective view illustrating an arrangement structure of a window according to an embodiment of FIG. 21.
Figure 23:
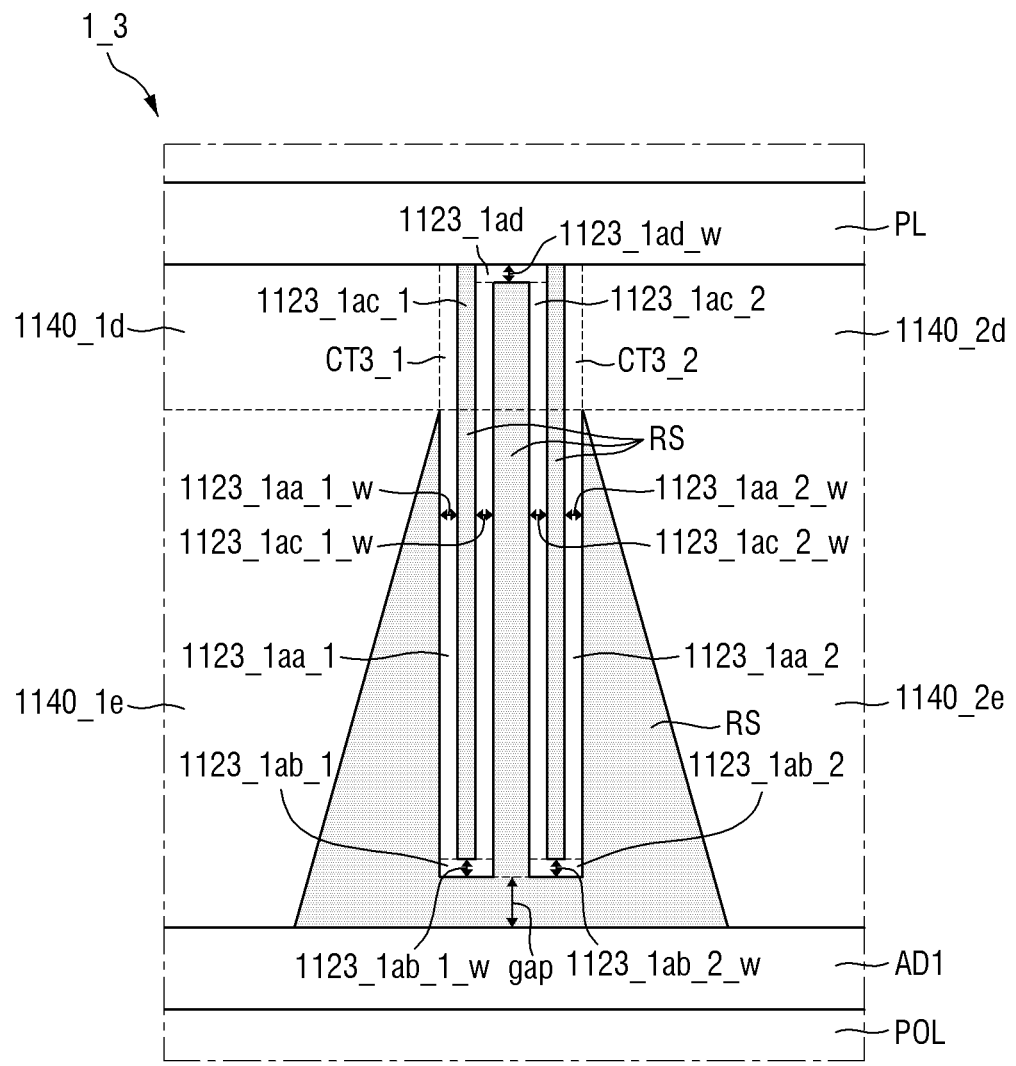
FIG. 23 is a schematic plan view illustrating an arrangement structure of a window according to an embodiment of FIG. 21.

FIG. 21 is a schematic perspective view illustrating a structure of a window of a display device according to an embodiment. FIG. 22 is a schematic perspective view illustrating an arrangement structure of a window according to an embodiment of FIG. 21. FIG. 23 is a schematic plan view illustrating an arrangement structure of a window according to an embodiment of FIG. 21.

Referring to FIGS. 21 to 23, a first segment part 1133 of a window 1103 of a display device 1_3 according to an embodiment may include bridges 1123 which have several curved shapes. In detail, the bridges 1123 may have at least two bent parts that are curved toward the other side in the third direction DR3, for example, toward the display panel PNL. As described above, the bridges 1123 include a first bridge 1123_1 for connecting the edge portions 1140*a* of the respective segments 1140, and shapes and structures of a (1_1)th bridge 1123_1*a* and a (1_2)th bridge 1123_1*b* of the first bridge 1123_1 are substantially the same as each other. Therefore, the description will be based on the (1_1)th bridge 1123_1*a*, and the description of the (1_2)th bridge 1123_1*b* will be omitted.

The (1_1)th bridge 1123_1*a* according to an embodiment is disposed between the first segment 1140_1 and the second segment 1140_2 to connect the first segment 1140_1 with the second segment 1140_2. The (1_1)th bridge 1123_1*a* may include a first connection portion CT3_1, a second connection portion CT3_2, a first extension portion 1123_1*aa*, a second extension portion 1123_1*ac*, lower end portion 1123_1*ab* which includes a first lower end portion 1123_1*ab*_1, a second lower end portion 1123_1*ab*_2, and an upper end portion 1123_1*ad*. In detail, the (1_1)th bridge 1123_1*a* may include a first connection portion CT3_1 integrally connected to one side or a side or a side of the first segment 1140_1 in the second direction DR2, a (1_1)th extension portion 1123_1*aa*_1 extended from the first connection portion CT3_1 to the other side or another side in the third direction DR3, a second connection portion CT3_2 integrally connected to the other side or another side of the second segment 1140_2 in the second direction DR2, a (1_2)th extension portion 1123_1*aa*_2 extended from the second connection portion CT3_2 to the other side in the third direction DR3, a first lower end portion 1123_1*ab*_1 extended from an end of the other side of the (1_1)th extension portion 1123_1*aa*_1 in the third direction DR3 to the second direction DR2, a second lower end portion 1123_1*ab*_2 extended from an end of the other side of the (1_2)th extension portion 1123_1*aa*_2 in the third direction DR3 to the second direction DR2, a (2_1)th extension portion 1123_1*ac*_1 extended from an end of one side or a side of the first lower end portion in the second direction DR2 to one side or a side in the third direction DR3, a (2_2)th extension portion 1123_1*ac*_2 extended from an end of the other side of the second lower end portion 1123_1*ab*_2 in the second direction DR2 to one side or a side in the third direction DR3, and an upper end portion 1123_1*ad* extended from the (2_1)th extension portion 1123_1*ac*_1 to the (2_2)th extension portion 1123_1*ac*_2 in the second direction DR2.

The (1_1)th extension portion 1123_1*aa*_1, the first lower end portion 1123_1*ab*_1 and the (2_1)th extension portion 1123_1*ac*_1 form a first bent part of the bent part, and the (1_2)th extension portion 1123_1*aa*_2, the second lower end portion 1123_1*ab*_2 and the (2_2)th extension portion 1123_1*ac*_2 form a second bent part of the bent part. Therefore, the (1_1)th bridge 1123_1*a* may have a shape similar to 'U', which is continuously disposed in case that viewed from the first direction DR1. Generally, as a larger number of bent parts are formed, curved characteristics of the bridge may be more improved.

A width 1123_1*aa*_1_w of the (1_1)th extension portion 1123_1*aa*_1 of the (1_1)th bridge 1123_1*a* in the second direction DR2, a width 1123_1*aa*_2_w of the (1_2)th extension portion 1123_1*aa*_2 in the second direction DR2, a width 1123_1*ab*_1_w of the first lower end portion 1123_1*ab*_1 in the third direction DR3, a width 1123_1*ab*_2_w of the second lower end portion 1123_1*ab*_2 in the third direction DR3, a width 1123_1*ac*_1_w of the (2_1)th extension portion 1123_1*ac*_1 in the second direction DR2, and a width 1123_1*ac*_2_w of the (2_2)th extension portion 1123_1*ac*_2 in the second direction DR2 may be substantially the same as one another. In other words, the (1_1)th bridge 1123_1*a* may have a shape in which a flat panel of a thickness is bent and curved toward the other side in the third direction DR3, for example, toward the display panel PNL several times. The width 1123_1*aa*_1_w of the (1_1)th extension portion 1123_1*aa*_1 in the second direction DR2, the width 1123_1*aa*_2_w of the (1_2)th extension portion 1123_1*aa*_2 in the second direction DR2, the width 1123_1*ab*_1_w of the first lower end portion 1123_1*ab*_1 in the third direction DR3, the width 1123_1*ab*_2_w of the second lower end portion 1123_1*ab*_2 in the third direction DR3, the width 1123_1*ac*_1_w of the (2_1)th extension portion 1123_1*ac*_1 in the second direction DR2, the width 1123_1*ac*_2_w of the (2_2)th extension portion 1123_1*ac*_2 in the second direction DR2 and the width 1123_1*ad*_w of the upper end portion 1123_1*ad* in the third direction DR3 may be in a range of about 20 µm to about 50 µm. The bending characteristics of the (1_1)th bridge 1123_1*a* may be improved by the above configuration, whereby bending of the (1_1)th bridge 1123_1*a* may be more facilitated.

A curing resin RS may be filled in a gap space between the (1_1)th extension portion 1123_1*aa*_1 and the (2_1)th extension portion 1123_1*ac*_1, a gap space between the (1_2)th extension portion 1123_1*aa*_2 and the (2_2)th extension portion 1123_1*ac*_2 and a gap space between the first segment 1140_1 and the second segment 1140_2 as the outside of the bent part.

The first lower end portion 1123_1*ab*_1 and the second lower end portion 1123_1*ab*_2 may be the lowermost end portions of the (1_1)th bridge 1123_1*a*. The first lower end portion 1123_1*ab*_1 and the second lower end portion 1123_1*ab*_2 may form a gap space formed by being spaced apart from the first adhesive member AD1 in the third direction DR3. In other words, the first lower end portion 1123_1*ab*_1 and the second lower end portion 1123_1*ab*_2 may be spaced apart from the first adhesive member AD1 in the third direction DR3 with the curing resin RS interposed therebetween. Therefore, since the first lower end portion 1123_1*ab*_1 and the second lower end portion 1123_1*ab*_2 are not attached to the first adhesive member AD1, the (1_1)th bridge 1123_1*a* may be more freely bent.

Bending characteristics in the shape of the bridge described in the embodiment of FIG. 7, 18 or 21 may vary depending on the number of bent parts. In detail, as the number of bent parts formed in the bridge is increased, bending characteristics may be improved. In other words, the bending characteristic of the bridge 1123 according to the embodiment of FIG. 21 is the greatest and the bending characteristic of the bridge 1120 according to the embodiment of FIG. 7 is the smallest.

Figure 24:
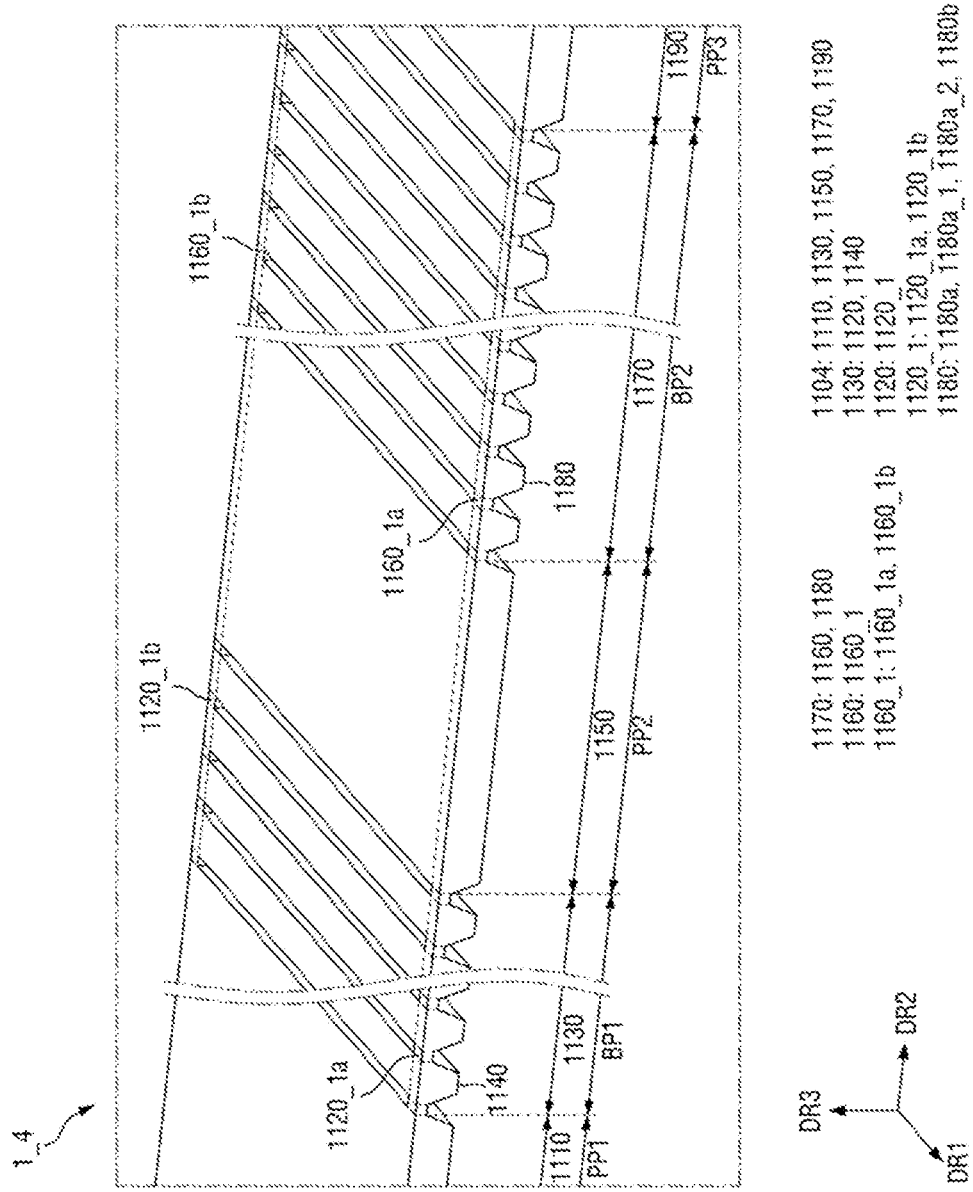
FIG. 24 is a schematic perspective view illustrating a structure of a window of a display device according to an embodiment.

FIG. 24 is a schematic perspective view illustrating a structure of a window of a display device according to an embodiment.

Referring to FIG. 24, a display device 1_4 according to an embodiment may be different from the display device 1 according to an embodiment of FIG. 7 in that the display device 1_4 may further include a second bending portion BP2 and a third flat portion PP3 in comparison with the display device 1 according to the embodiment of FIG. 7. In detail, a window 1104 of the display device 1_4 according to an embodiment may further include a second segment part 1170 disposed to overlap the second bending portion BP2 and a third flat panel part 1190 disposed to overlap the third flat portion PP3.

The first flat portion PP1, the first bending portion BP1, the second flat portion PP2, the second bending portion BP2 and the third flat portion PP3 of the display device 1_4 may be equally applied to the display module DM described in FIG. 6B, for example, the upper protective film PL, the window 1100, the first adhesive member AD1, the display panel PNL, the panel lower member PF, the barrier member CP, the panel support SS, the second adhesive member AD2, the digitizer DZ, the metal support MP and the buffer member CS. For example, a portion of the display panel PNL overlapped the first flat portion PP1 of the display device 1_4 may be a first flat portion of the display panel PNL, a portion of the display panel PNL overlapped the second flat portion PP2 of the display device 1_4 may be a second flat portion of the display panel PNL, a portion of the display panel PNL overlapped the third flat portion PP3 of the display device 1_4 may be a third flat portion of the display panel PNL, and a portion of the display panel PNL overlapped the second bending portion BP2 of the display device 1_4 may be a first bending portion of the display panel PNL. The first flat panel part 1110 of the window 1104 may overlap the first flat portion of the display panel PNL, the second flat panel part 1150 may overlap the second flat portion of the display panel PNL, the third flat panel part 1190 may overlap the third flat portion of the display panel PNL, the first segment part 1130 may overlap the first bending portion of the display panel PNL, and the second segment part 1170 may overlap the second bending portion of the display panel PNL.

The second segment part 1170 may protect the second bending portion BP2 of the display device 1_4 from the outside. The second segment part 1170 may include segments 1180 extended in the first direction DR1 and spaced apart from each other in the second direction DR2 and bridges 1160 connecting both ends of each of the segments 1180 in the first direction DR1 to each other. The segments 1180 may include edge portions 1180*a* positioned at both ends in the first direction DR1 and an inner side portion 1180*b* positioned between the edge portions 1180*a*. The edge portions 1180*a* may include a first edge portion 1180*a*_1 at one side or a side in the first direction DR1 and a second edge portion 1180*a*_2 at the other side in the first direction DR1. The bridges 1160 may include a first bridge 1160_1 for connecting the edge portions 1180*a*, and the first bridge 1160_1 may include a (1_1)th bridge 1160_1*a* connecting the first edge portions 1180*a*_1, and a (1_2)th bridge 1160_1*b* connecting the second edge portions 1180*a*_2.

Since the segments 1180 and the bridges 1160 are substantially the same as the segments 1140 and the bridges 1120, which are described in the embodiment of FIG. 7, their detailed description will be omitted.

The second segment part 1170 may have a width that is greater in the second direction DR2 than the first segment part 1130. Therefore, as described above, the second segment part 1170 may be bent in the second bending portion BP2 at a curvature radius R2 greater than that of the first bending portion BP1 (see FIGS. 4 and 5).

In FIG. 24, the segments 1140 of the first segment part 1130 and the segments 1180 of the second segment part 1170 are shown as being connected to the bridges 1120 and 1160 having a same shape as that of the bridges according to the embodiment of FIG. 7, but are not limited thereto. For example, the segments 1140 of the first segment part 1130 and the segments 1180 of the second segment part 1170 may be connected to bridges having a same shape as one of the bridges 1122 according to the embodiment of FIG. 18 or the bridges 1123 according to the embodiment of FIG. 21.

The bridges 1120 and 1160 connecting the segments 1140 of the first segment part 1130 with the segments 1180 of the second segment part 1170 may be different from each other. For example, in case that the second bending portion BP2 is bent in the second bending portion BP2 at a curvature radius R2 greater than that of the first bending portion BP1 and thus needs bending characteristic in the second bending portion BP2, which is smaller than that of the first bending portion BP1, the bridge 1160 connecting the segments 1140 of the second segment part 1170 may have a shape of the bridge 1122 according to the embodiment of FIG. 7, and the bridge 1120 connecting the segments 1140 of the first segment part 1130 may have a shape of one of the bridge 1122 according to the embodiment of FIG. 18 or the bridge 1123 according to the embodiment of FIG. 21.

Figure 25:
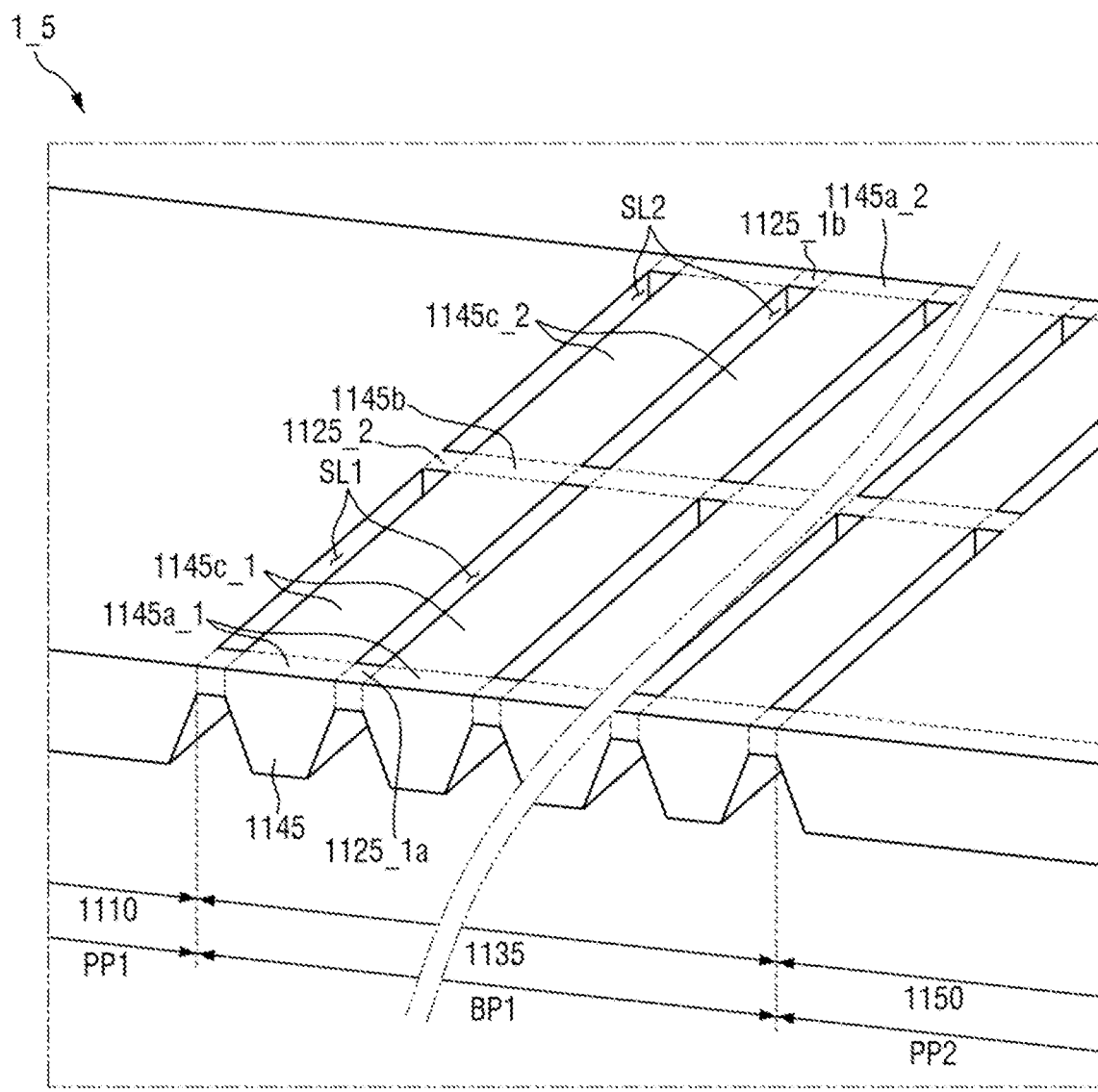
FIG. 25 is a schematic perspective view illustrating a structure of a window of a display device according to an embodiment.

FIG. 25 is a schematic perspective view illustrating a structure of a window of a display device according to an embodiment.

Referring to FIG. 25, a first segment part 1135 of a window 1105 of a display device 1_5 according to an embodiment may include bridge 1125, and the bridge 1125 includes a first bridge 1125_1 and a second bridge 1125_2. For example, respective inner side portions 1145b of segments 1145 of a display device 1_5 are connected to each other by the second bridge 1125_2, and the first bridge 1125_1 and the second bridge 1125_2 may have a same shape. In detail, the respective segments 1145 according to an embodiment may be connected to each other in a first edge portion 1145a_1, a second edge portion 1145a_2 and the inner side portion 1145b, and may be spaced apart from each other in a side portion 1145c.

A bridge 1125 of a window 1105 according to an embodiment may further include a second bridge 1125_2. The second bridge 1125_2 may be disposed between a (1_1)th bridge 1125_1a and a (1_2)th bridge 1125_1b of the first bridge 1125_1. The first bridge 1125_1 may overlap a first non-display area (see NDA1 of FIG. 1) of the display device 1_5, and the second bridge 1125_2 may overlap a first display area (see DA1 of FIG. 1).

Each of the segments 1145 may include edge portions 1145a positioned on both ends in the first direction DR1, an inner side portion 1145b positioned between the edge portions 1145a, and a side portion 1145c disposed between the edge portion 1145a and the inner side portion 1145b. Since the description of the edge portion 1145a is the same as that described with reference to FIG. 7, its detailed description will be omitted. In an embodiment, the inner side portion 1145b may be positioned at the center of the segments 1145 in the first direction DR1, but is not limited thereto. Hereinafter, for convenience of description, the description will be based on that the inner side portion 1145b is positioned at the center of the segments 1145 in the first direction DR1.

The side portion 1145c may include a first side portion 1145c_1 disposed between a first edge portion 1145a_1 and an inner side portion 1145b of one end or an end of the first direction DR1 and a second side portion 1145c_2 disposed between the second edge portion 1145a_2 and the inner side portion 1145b at the other end of the first direction DR1. The side portion 1145c may overlap the first display area of the display device 1_5 (see DA1 in FIG. 1). In an embodiment, in case that viewed from the third direction DR3, the first side portion 1145c_1 may have a rectangular planar shape connecting an end of the other side of the first edge portion 1145a_1 in the first direction DR1 with an end of the inner side portion 1145b in the first direction DR1, and the second side portion 1145c_2 may have a rectangular planar shape connecting an end of one side or a side of the second edge portion 1145a_2 in the first direction DR1 with an end of the other side of the inner side portion 1145b in the first direction DR1, but these side portions are not limited thereto.

The inner side portion 1145b may be in contact with the side portion 1145c at both ends in the first direction DR1. In detail, one side or a side of the inner side portion 1145b in the first direction DR1 may be in contact with the first side portion 1145c_1, and the other side thereof in the first direction DR1 may be in contact with the second side portion 1145c_2. A width of the inner side portion 1145b in the first direction DR1 may be the same as that of the second bridge 1125_2 in the first direction DR1.

As described above, the respective segments 1145 may be connected to each other in the edge portion 1145a by the first bridge 1125_1 of the bridges 1125, connected to each other in the inner side portion 1145b by the second bridge 1125_2 and spaced apart from each other in the side portion 1145c in the second direction DR2. Therefore, a slit SL defined by a width of the side portion 1145c in the first direction DR1 and a width of each of the first bridge 1125_1 and the second bridge 1125_2 in the second direction DR2, passing through the window 1105 in the third direction DR3 may be formed between the respective segments 1145. In detail, the slit SL may include a first slit SL1 defined by the width of the first side portion 1145c_1 in the first direction DR1 and the width of the second bridge 1125_2 in the second direction DR2 and a second slit SL2 defined by the width of the second side portion 1145c_2 in the first direction DR1 and the width of the second bridge 1125_2 in the second direction DR2.

In an embodiment, the first bridge 1125_1 and the second bridge 1125_2 may have a same shape as that of the bridge 1120 according to the embodiment of FIG. 7, the bridge 1122 according to the embodiment of FIG. 18 or the bridge 1123 according to the embodiment of FIG. 21.

The segments 1145 of the display device 1_5 according to an embodiment may be more stably maintained at intervals by the above configuration, and its distortion may be avoided.

Figure 26:
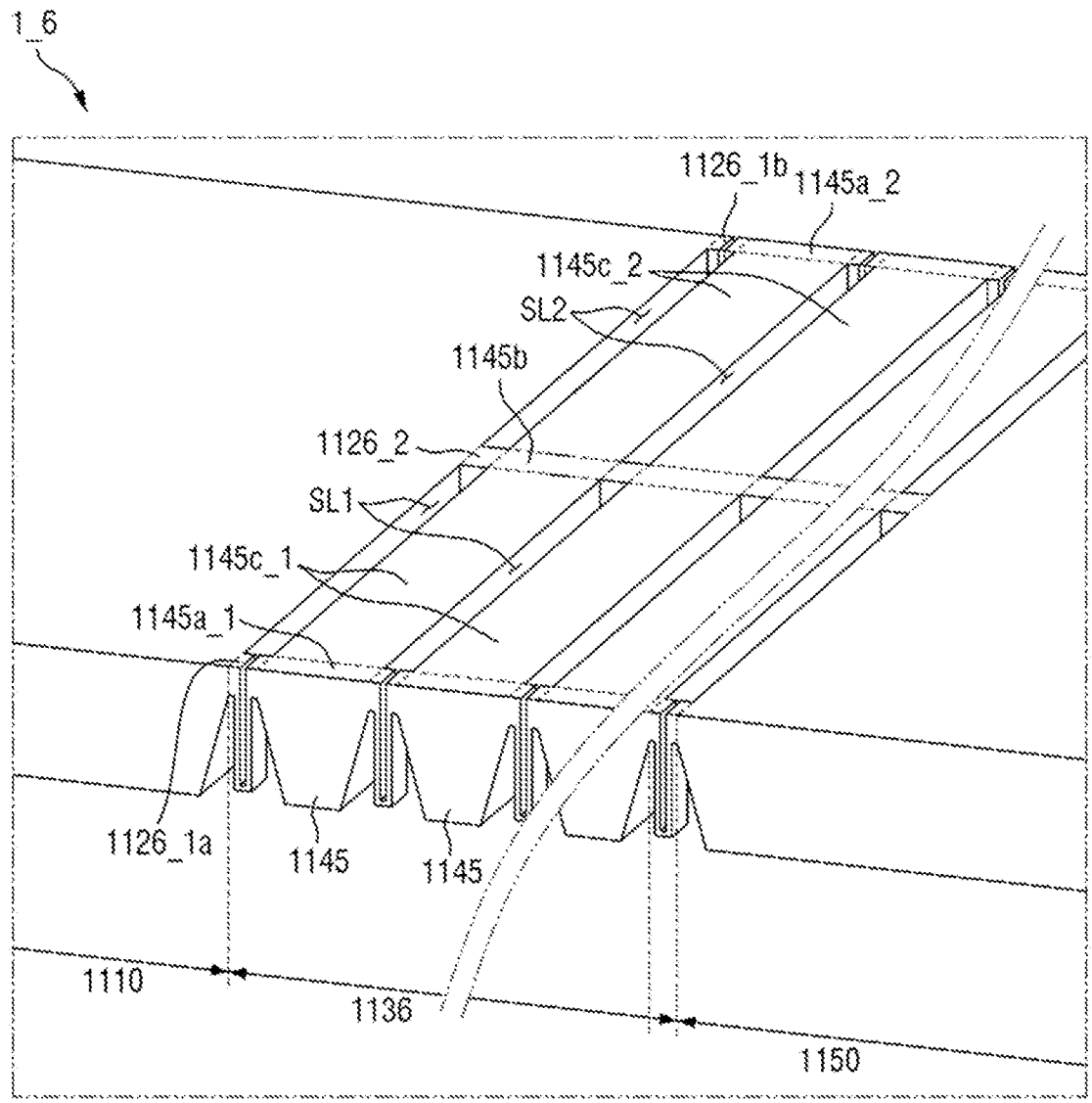
FIG. 26 is a schematic perspective view illustrating a structure of a window of a display device according to an embodiment.

FIG. 26 is a schematic perspective view illustrating a structure of a window of a display device according to an embodiment.

Referring to FIG. 26 a first segment part 1136 of a window 1106 of a display device 1_6 according to an embodiment may include bridge 1126, and the bridge 1126 includes a first bridge 1126_1 and a second bridge 1126_2. For example, a display device 1_6 according to an embodiment may be different from the display device 1_5 according to an embodiment of FIG. 24 in that the first bridge 1126_1 and the second bridge 1126_2 have their respective shapes different from each other, and the other configurations are substantially the same or similar to those of the display device 1_5 according to the embodiment of FIG. 24. In detail, the first bridge 1126_1 may have a shape having bending characteristic higher than that of the second bridge 1126_2.

In case that the display device 1_6 is bent, stress applied to a first segment part 1136 of a window 1106 may be the strongest at the inner side portion 1145b, and may be the weakest in the edge portion 1145a. Therefore, the first bridge 1126_1 having a shape of a relatively great bending characteristic may be disposed on the edge portion 1145a to which the weakest stress is applied, and the second bridge 1126_2 having a shape of a relatively small bending characteristic may be disposed on the inner side portion 1145b to which the strongest stress is applied. For example, the first bridge 1126_1 includes a (1_1)th bridge 1126_1a, which connects the first edge portion 1145a_1, and a (1_2)th bridge 1126_2a, which connects the second edge portion 1145a_2. Therefore, in case that the display device 1_6 is bent, the second bridge 1126_2 connecting the inner side portion 1145b to which the strongest stress is applied may be prevented from being broken. An interval of each of the segments 1145 may be maintained more stably, and distortion thereof may be avoided.

In an embodiment, the first bridge 1126_1 has a same shape as that of the bridge 1122 according to the embodiment of FIG. 18 and the second bridge 1126_2 may have a same shape as that of the bridge 1120 according to the embodiment of FIG. 7, but these bridges are not limited thereto. For example, the first bridge 1126_1 may have a same shape as that of the bridge 1123 according to an embodiment of FIG. 21, and the second bridge 1126_2 may have a same shape as that of the bridge 1120 according to the embodiment of FIG. 7, or the first bridge 1126_1 may have a same shape as that of the bridge 1123 according to the embodiment of FIG. 21 and the second bridge 1126_2 may have a same shape as that of the bridge 1122 according to the embodiment of FIG. 18. In other words, the shape of the first bridge 1126_1 and the second bridge 1126_2 is not limited within the range that the first bridge 1126_1 has a shape having bending characteristic stronger than that of the second bridge 1126_2.

Figure 27:
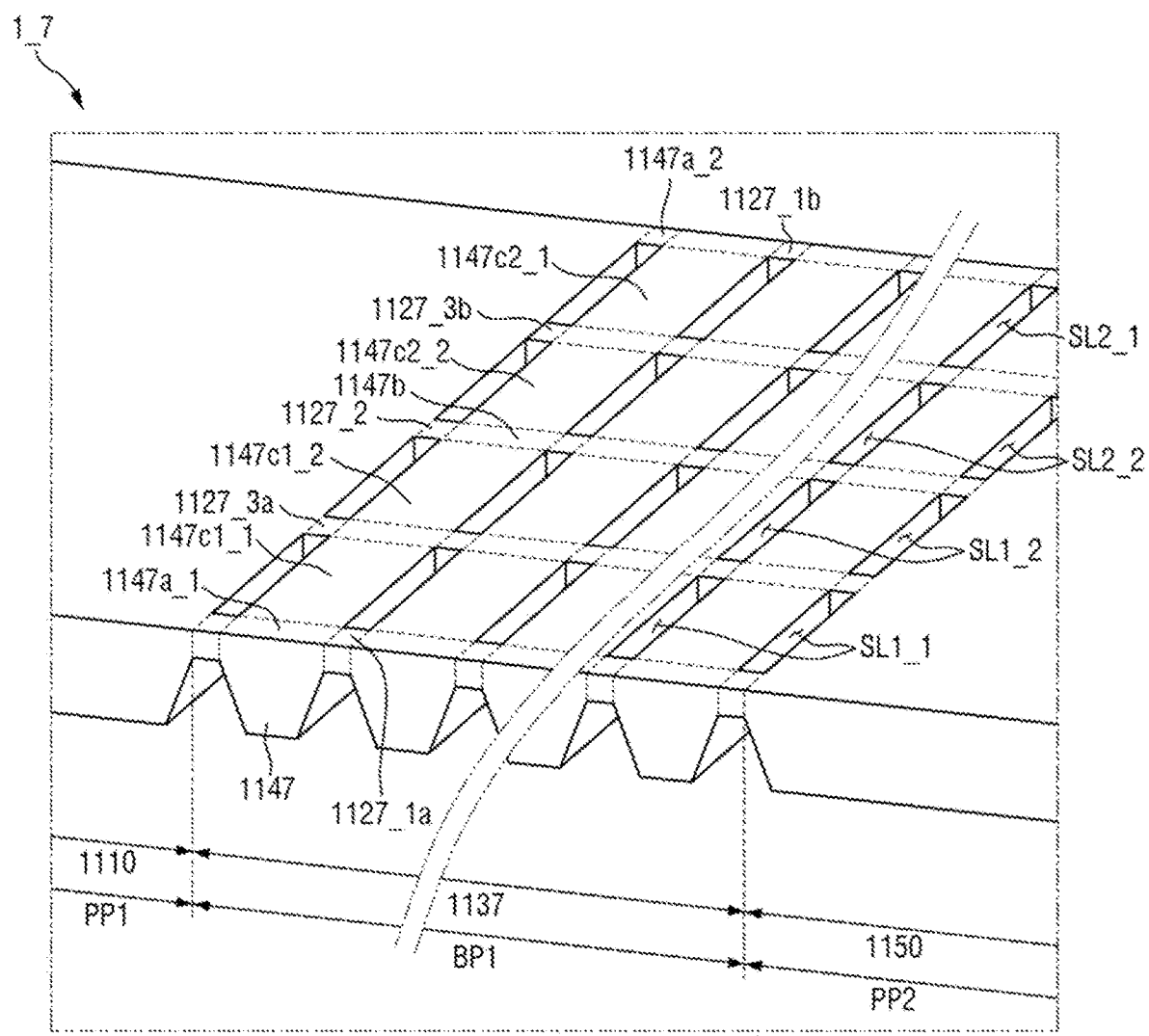
FIG. 27 is a schematic perspective view illustrating a structure of a window of a display device according to an embodiment.

FIG. 27 is a schematic perspective view illustrating a structure of a window of a display device according to an embodiment.

Referring to FIG. 27, a first segment part 1137 of a window 1107 of a display device 1_7 according to an embodiment may include bridge 1127, and the bridge 1127 includes a first bridge 1127_1, a second bridge 1127_2 and a third bridge 1127_3. For example, a display device 1_7 may be different from the display device 1_5 according to an embodiment of FIG. 25 in that respective segments 1147 are connected to each other in a side portion 1147c by a third bridge 1127_3, and a first bridge 1127_1, a second bridge 1127_2 and the third bridge 1127_3 may have a same shape. In detail, the third bridge 1127_3 according to an embodiment may divide a first side portion 1147c_1 and a second side portion 1147c_2 of each of the segments 1147 by partially intersecting them.

A bridge 1127 of a window 1107 may further include a third bridge 1127_3. The third bridge 1127_3 may include a (3_1)th bridge 1127_3a intersecting the first side portion 1147c_1 and a (3_2)th bridge 1127_3b intersecting the second side portion 1147c_2. The third bridge 1127_3 may be disposed between the first bridge 1127_1 and the second bridge 1127_2. In detail, the (3_1)th bridge 1127_3a may be disposed between the (1_1)th bridge 1127_1a and the second bridge 1127_2, and the (3_2)th bridge 1127_3b may be disposed between the (1_2)th bridge 1127_1b and the second bridge 1127_2. The first bridge 1127_1 may overlap the first non-display area (see NDA1 of FIG. 1) of the display device 1_7, the second bridge 1127_2 may overlap the first display area (see DA1 of FIG. 1), and the third bridge 1127_3 may overlap the first display area (see DA1 in FIG. 1).

In an embodiment, the third bridge 1127_3 may be disposed at the center of the side portion 1147c in the first direction DR1 to intersect the center of the side portion 1147c in the first direction DR1, but is not limited thereto. For convenience of description, the description will be based on that the third bridge 1127_3 is disposed at the center of the side portion 1147c in the first direction DR1.

The first side portion 1147c_1 may be divided into a (1_1)th side portion 1147c1_1 on one side or a side in the first direction DR1 and a (1_2)th side portion 1147c1_2 on the other side in the first direction DR1 by the (3_1)th bridge 1127_3a, and the second side portion 1147c_2 may be divided into a (2_1)th side portion 1147c2_1 on the other side in the first direction DR1 and a (2_2)th side portion 1147c2_2 on one side or a side in the first direction DR1 by the (3_2)th bridge 1127_3b. The (1_1)th side portion 1147c1_1 and the (2_1)th side portion 1147c2_1 may be adjacent to an edge portion 1147a of each of the segments 1147, and the (1_2)th side portion 1147c1_2 and the (2_2)th side portion 1147c2_2 may be adjacent to an inner side portion 1147b of each of the segments 1147, edge portion 1147a may include a first edge portion 1147a_1, which is disposed on a one side of the first direction DR1, and a second edge portion 1147a_2, which is disposed on another side of the first direction DR1. The (3_1)th bridge 1127_3a may be disposed at the center of the first side portion 1147c_1 so that a width of the (1_1)th side portion 1147c1_1 in the first direction DR1 and a width of the (1_2)th side portion 1147c1_2 in the first direction DR1 may be substantially the same as each other, and the (3_2)th bridge 1127_3b may be disposed at the center of the second side portion 1147c_2 so that a width of the (2_1)th side portion 1147c2_1 in the first direction DR1 and a width of the (2_2)th side portion 1147c2_2 in the first direction DR1 may be substantially the same as each other.

As the third bridge 1127_3 is divided across the first side portion 1147c_1 and the second side portion 1147c_2 of each of the segments 1147, the first slit SL1 and the second slit SL2 may be also divided. In detail, the first slit SL1 may be divided into a (1_1)th slit SL1_1 defined by a width of the (1_1)th side portion 1147c1_1 in the first direction DR1 and a width of the (3_1)th bridge 1127_3a in the second direction DR2, and a (1_2)th slit SL1_2 defined by a width of the (1_2)th side portion 1147c1_2 in the first direction DR1 and a width of the (3_1)th bridge 1127_3a in the second direction DR2. The second slit SL2 may be divided into a (2_1)th slit SL2_1 defined by a width of the (2_1)th side portion 1147c2_1 in the first direction DR1 and a width of the (3_2)th bridge 1127_3b in the second direction DR2, and a (2_2)th slit SL2_2 defined by a width of the (2_2)th side portion 1147c2_2 in the first direction DR1 and a width of the (3_2)th bridge 1127_3b in the second direction DR2.

In an embodiment, the first bridge 1127_1, the second bridge 1127_2 and the third bridge 1127_3 may have a same shape as that of the bridge 1120 according to the embodiment of FIG. 7, the bridge 1122 according to the embodiment of FIG. 18 or the bridge 1123 according to the embodiment of FIG. 21, but is not limited thereto.

The segments 1147 of the display device 1_7 according to an embodiment may be more stably maintained at intervals by the above configuration, and its distortion may be avoided.

Figure 28:
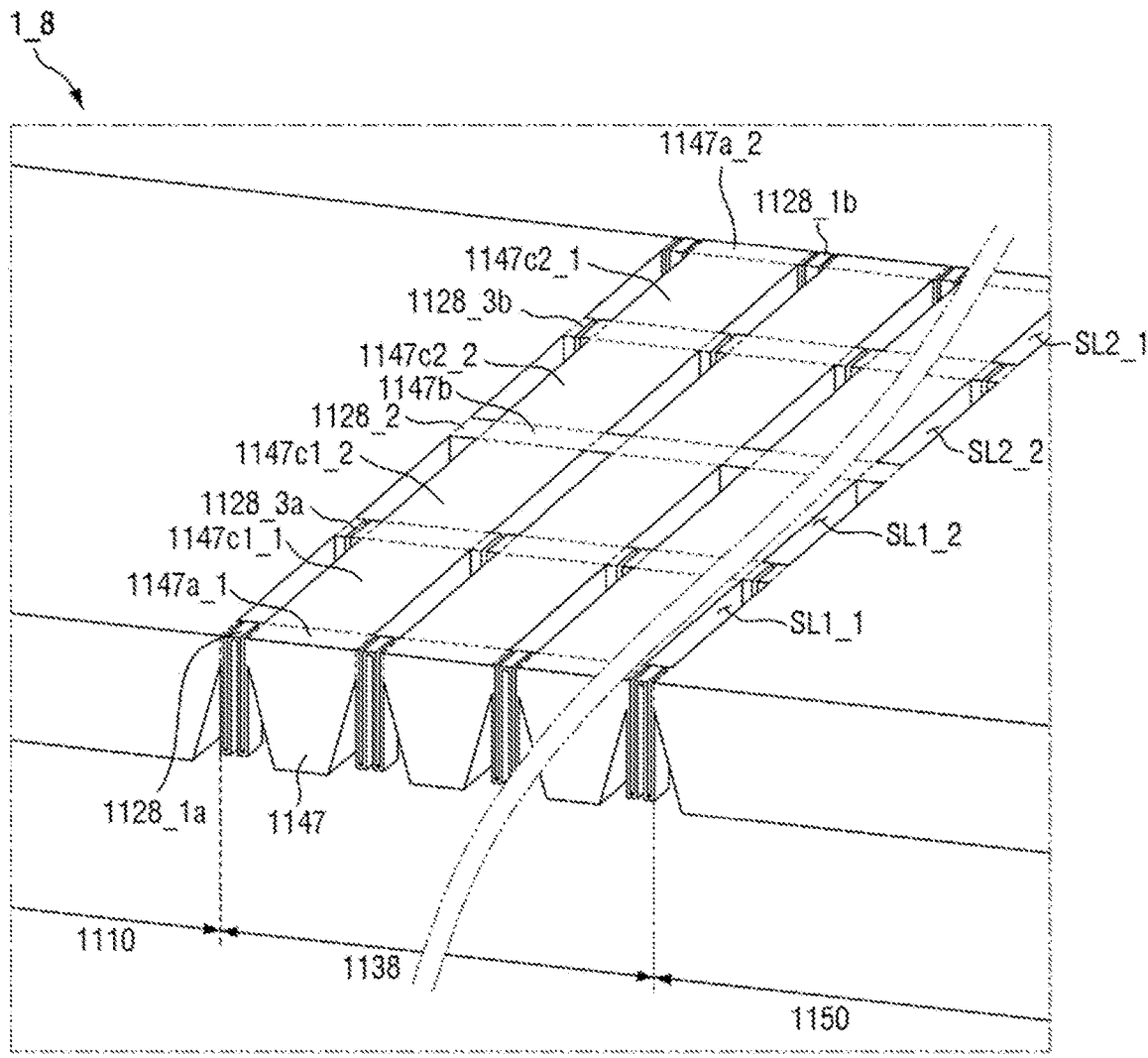
FIG. 28 is a schematic perspective view illustrating a structure of a window of a display device according to an embodiment.

FIG. 28 is a schematic perspective view illustrating a structure of a window of a display device according to an embodiment.

Referring to FIG. 28 a first segment part 1138 of a window 1108 of a display device 1_8 according to an embodiment may include bridge 1128, and the bridge 1128 includes a first bridge 1128_1, a second bridge 1128_2, and a third bridge 1128_3. For example, a display device 1_8 may be different from the display device 1_7 according to an embodiment of FIG. 27 in that the first bridge 1128_1, the second bridge 1128_2 and the third bridge 1128_3 have respective shapes different from one another, and the other configurations are substantially the same or similar to those of the display device 1_7 according to the embodiment of FIG. 27. In detail, the first bridge 1128_1 may have a shape having a bending characteristic higher than that of the second bridge 1128_2 and the third bridge 1128_3, and the third bridge 1128_3 may have a shape having a bending characteristic higher than that of the second bridge 1128_2.

In case that the display device 1_8 is bent, stress applied to a first segment part 1138 of a window 1108 may be the strongest in the inner side portion 1147b, and may be the weakest in the edge portion 1147a. In other words, the stress applied to the first segment part 1138 may be strong in the order of the inner side portion 1147b, the side portion 1147c and the edge portion 1147a. Therefore, the first bridge 1128_1 having a shape of a relatively great bending characteristic may be disposed on the edge portion 1147a to which the weakest stress is applied, and the second bridge 1128_2 having a shape of a relatively small bending characteristic may be disposed on the inner side portion 1147b to which the strongest stress is applied. A third bridge 1128_3 having a shape of a bending characteristic relatively greater than that of the first bridge 1128_1 and relatively smaller than that of the second bridge 1128_2 may be disposed at the center of the side portion 1147c to which stress stronger than that of the edge portion 1147a and weaker than that of the inner side portion 1147b is applied. For example, the first bridge 1128_1 includes a (1_1)th bridge 1128_1a, which connecting the first edge portion 1147a_1, and a (1_2)th bridge 1128_1b, which connecting the second edge portion 1147a_2, and the third bridge 1128_3 includes a (3_1)th bridge 1128_3a, which connecting the first side part 1147c1, and a (3_2)th bridge 1128_3b, which connecting the second side part 1147c2. Therefore, in case that the display device 1_6 is bent, the second bridge 1128_2 connecting the inner side portion 1147b to which the strongest stress is applied may be prevented from being broken. An interval of each of the segments 1147 may be maintained more stably, and distortion thereof may be avoided.

In an embodiment, the first bridge 1128_1 may have a same shape as that of the bridge 1123 according to the embodiment of FIG. 21, the second bridge 1128_2 may have a same shape as that of the bridge 1122 according to the embodiment of FIG. 18 and the third bridge 1128_3 may have a same shape as that of the bridge 1120 according to the embodiment of FIG. 7, but these bridges are not limited thereto.

Figure 29:
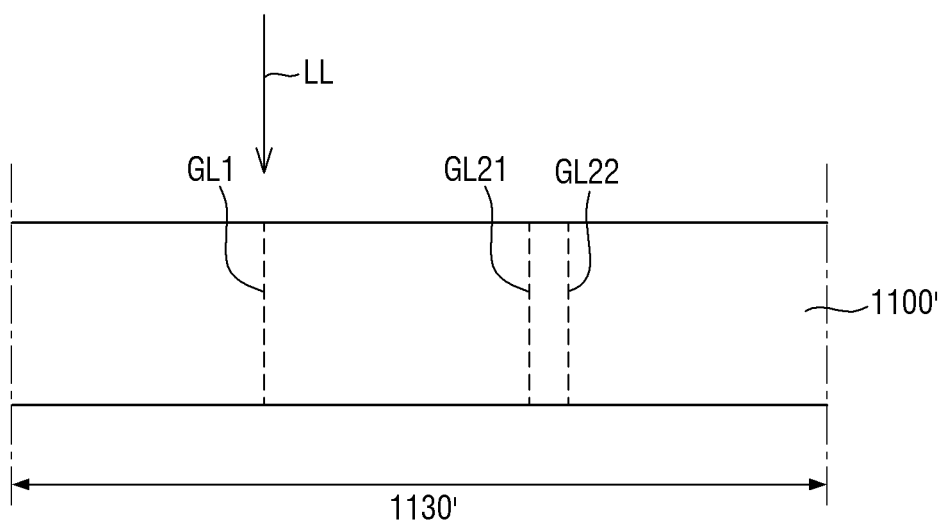
FIGS. 29 to 31 are schematic views illustrating a process of processing a slit or bridge of a window according to an embodiment.
Figure 30:
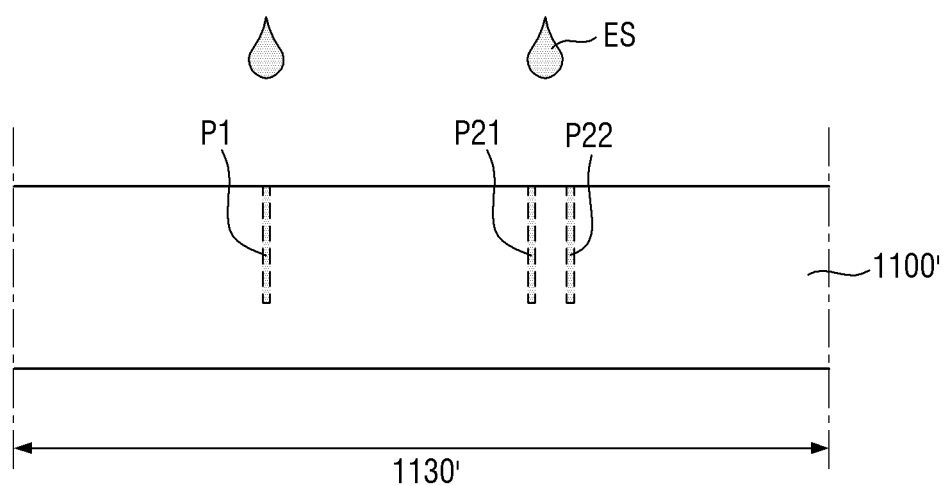
Figure 31:
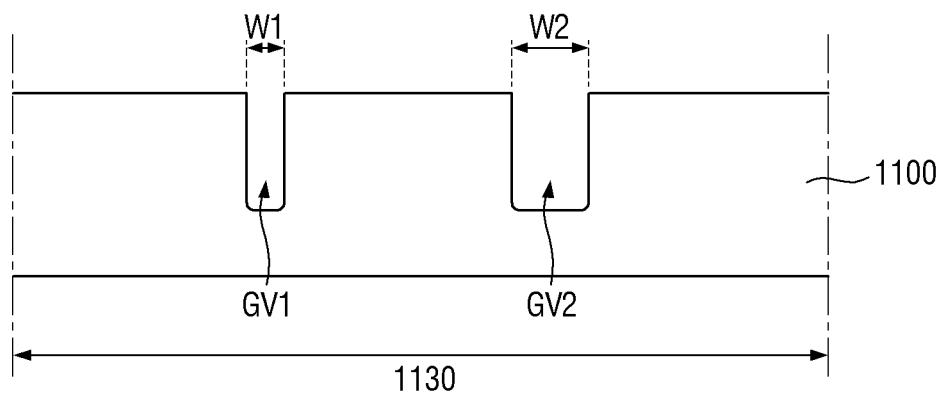

FIGS. 29 to 31 are schematic views illustrating a process of processing a slit or bridge of a window according to an embodiment of the disclosure. Groove patterns GV1 and GV2 described in FIGS. 29 to 31 may refer to the slit SL or the bridge 1120 of the window 1100 according to an embodiment. Further, a mother substrate 1100' may refer to a state that the slit SL or the bridge 1120 is not formed in the window 1100.

Referring to FIG. 29, virtual lines for forming groove patterns are defined on the first segment part 1130' of the mother substrate 1100'. The virtual lines may correspond to a formation position of the groove patterns to be formed, and may be defined in parallel with an extension direction of the groove patterns to be formed. In FIG. 29, lines GL1, GL21 and GL22 defined to form the groove patterns are defined to correspond to the respective groove patterns to be formed. Hereinafter, the respective lines will be referred to as a first line GL1 and second lines GL21 and GL22.

A laser LL may be irradiated toward a thickness direction of the mother substrate 1100' on the mother substrate 1100'. The laser LL may be irradiated to points to overlap the lines GL1, GL21 and GL22.

A phase change may occur in the points, to which the laser LL is irradiated, due to local melting caused by the laser LL, whereby a refractive index may be changed. A refractive index of the points to which the laser LL is irradiated may be different from that of the mother substrate 1100' before the laser LL is irradiated. The laser LL may have an intensity of a level that varies a refractive index of a portion of the mother substrate 1100' without cutting a portion of the mother substrate 1100'.

The laser LL may have a pulse energy. A pulse duration of the laser LL may range from hundreds of picoseconds to tens of femtoseconds. For example, the pulse duration of the laser LL may be about 200 picoseconds or less. The pulse duration of the laser LL may vary depending on a material or thickness of the mother substrate 1100'. A wavelength of the laser LL may be in a range of about 250 nm to about 1500 nm, for example about in a range of about 340 nm to about 1060 nm.

The laser LL may be a non-diffractive beam. For example, the laser LL may be a Bessel beam, but is not limited thereto. For example, the laser LL may be a Gaussian beam.

Referring to FIG. 30, the laser LL may be irradiated to the mother substrate 1100' to form portions having a changed refractive index and an etching solution is coated on the portions. For convenience of description, portions P1, P21 and P22 to which the laser is irradiated are shown as hatched areas in FIG. 30, but the portions P1, P21 and P22 to which the laser is irradiated may be fine and thus difficult to be identified with the naked eye.

Refractive indexes of the first portions P1 and the second portions P21 and P22 after the laser LL is irradiated may be different from that of the mother substrate 1100' before the laser is irradiated.

Each of the first portions P1 and the second portions P21 and P22 may be formed to have a diameter on a plane. For example, a diameter of each of the first portions P1 and the second portions P21 and P22 may be about 3 µm or less. Since the laser LL changes the refractive index without forming a physical hole in the mother substrate 1100' and sizes of portions where the refractive index is changed are small, an appearance change of the mother substrate 1100' due to the laser may not be readily visible, and may be visible using a microscope of a high magnification.

The first portions P1 and the second portions P21 and P22 may be spaced apart from each other at an interval. The interval between the first portions P1 and the second portions P21 and P22 may be a few micrometers (µm). An interval between the groove patterns GV1 and GV2, which will be formed, may vary depending on the interval between the first portions P1 and the second portions P21 and P22.

Each of the first portions P1 and the second portions P21 and P22 may have a thickness along a thickness direction. The thickness of each of the first portions P1 and the second portions P21 and P22 may be smaller than that of the mother substrate 1100'. The thickness of each of the first portions P1 and the second portions P21 and P22 may be controlled by adjusting the intensity of the laser. A depth of each of the first groove pattern GV1 and the second groove pattern GV2 may vary depending on the thickness of each of the first portions P1 and second portions P21 and P22.

As described above, as the second lines GL21 and GL22 are provided in columns, the second portions P21 and P22 may be also formed in columns. A width of the second groove pattern GV2 formed by the second portions P21 and P22 formed in columns may be smaller than that of the first groove pattern GV1 formed by the first portions P1 formed in one column.

An etching solution ES may be provided on the first portions P1 and the second portions P21 and P22. The etching solution ES may be provided by a spray method or a dipping method, and is not limited to any one embodiment. The etching solution ES may etch a portion of the mother substrate 1100' based on the first portions P1 and the second portions P21 and P22.

The etching solution ES may include an alkali solution. For example, the etching solution ES may include a sodium hydroxide (NaOH) solution or a potassium hydroxide (KOH) solution. As the etching solution ES may include an alkaline solution, the groove patterns GV1 and GV2 may be formed to have a bottom surface parallel with an upper surface of the mother substrate 1100' and sides including at least one curved surface. In case that the etching solution may include an acid solution such as a fluorinated hydrogen (HF) solution, a sharp grove pattern may be formed toward a lower surface of the mother substrate 1100'.

Shapes of the groove patterns may vary depending on etching or the amount of etching. The higher a concentration and a temperature of the etching solution ES are, the faster an etching rate may be. As the time in case that the mother substrate 1100' is exposed to the etching solution ES, for example, the etching time is increased, the amount of etching may be increased.

For example, as the temperature of the etching solution ES is increased, reactivity of the etching solution ES is increased, whereby the etch rate may be increased. The temperature of the etching solution ES may be a room temperature or more. For example, the temperature of the etching solution ES may be in a range of about 100° C. to about 150° C. In case that the temperature of the etching solution ES is lower than about 100° C., the reactivity of the etching solution ES may be reduced, and the process time for forming the groove pattern may be lengthened. In case that the temperature of the etching solution ES is higher than about 150° C., the mother substrate 1100' may be exposed to a high temperature and damaged.

Referring to FIG. 31, the mother substrate 1100' is exposed to the etching solution ES to form a window 1100 having groove patterns GV1 and GV2 formed on the first segment part 1130.

The groove patterns GV1 and GV2 may be formed in the window 1100 by performing the laser irradiation step and the etching step for the mother substrate 1100'.

In an embodiment, a first width W1 of the first groove pattern GV1 may be smaller than a second width W2 of the second groove pattern GV2. In a method of manufacturing a window of an embodiment, the first portions P1 formed through irradiation of the laser LL may be formed in one column, and the second portions P21 and P22 may be formed in columns. Therefore, the first width W1 of the first groove pattern GV1 may be smaller than the second width W2 of the second groove pattern GV2. However, the embodiment is not limited to the embodiments shown in FIGS. 29 and 30. In the method of manufacturing the window 1100 according to an embodiment, the number of columns of laser irradiated to positions where each groove pattern is formed, the time at which the laser is irradiated, an interval of the positions where the laser is irradiated, the intensity of the laser, etc. may be adjusted to manufacture the window according to the various embodiments shown in FIGS. 7, 18 and 21.

In concluding the detailed description, those skilled in the art will appreciate that many variations and modifications can be made to the embodiments without substantially departing from the principles of the disclosure. Therefore, the disclosed embodiments are used in a generic and descriptive sense only and not for purposes of limitation.

What is claimed is:

1. A display device comprising:
a display panel; and
a window disposed on an upper surface of the display panel, wherein
the window comprises:
a first flat panel part;
a second flat panel part disposed on a side of the first flat panel part in a first direction; and
a first segment part disposed between the first flat panel part and the second flat panel part,
the first segment part comprises:
segments extending in a second direction intersecting the first direction and spaced apart from each other in the first direction; and
bridges extending in the first direction, some of the bridges connecting corresponding first ends of adjacent segments among the segments and some of the bridges connecting corresponding second ends of the adjacent segments to each other, the second ends opposing the first ends in the second direction, and
the segments and the bridges comprise a same material, and
each of the bridges forms at least one bent part bent in a direction toward the display panel.

2. The display device of claim 1, wherein each of the segments has a shape including a width in the first direction reduced toward an upper surface of the display panel.

3. The display device of claim 2, wherein a curing resin is disposed in gap spaces between respective segments of the first segment part.

4. The display device of claim 1, wherein each of the bridges is thinner than each of the segments.

5. The display device of claim 4, wherein each of the bridges has a thickness in a range of about 20 μm to about 50 μm.

6. The display device of claim 5, wherein each of the segments of the first segment part are integral with each of the bridges and comprises glass.

7. The display device of claim 1, further comprising:
a first adhesive member disposed between the display panel and the window, wherein
a rear surface of each of the segments of the segment part is attached to the first adhesive member, and
a lowermost end portion of the bent part of each of the bridges is spaced apart from the first adhesive member.

8. The display device of claim 1, further comprising:
a metal support disposed below the display panel, wherein
the metal support comprises:
a first metal support member overlapping the first flat panel part of the window in a view in a third direction orthogonal to both the first direction and the second direction; and
a second metal support member spaced apart from the first metal support member and overlapping the second flat panel part in the view, and
a gap space between the first metal support member and the second metal support member overlaps the first segment part in the view.

9. The display device of claim 1, further comprising:
a digitizer disposed below the display panel, wherein
the digitizer comprises a first digitizer overlapping the first flat panel part of the window in a view in a third direction orthogonal to both the first direction and the second direction and a second digitizer spaced apart from the first digitizer and overlapping the second flat panel part in the view, and
a gap space between the first digitizer and the second digitizer overlaps the first segment part in the view.

10. The display device of claim 1, wherein
the window comprises:
a third flat panel part disposed on a side of the second flat panel part in the first direction; and
a second segment part disposed between the second flat panel part and the third flat panel part, the second segment part comprising additional segments and additional the bridges, and
the display panel comprises:
a first flat portion overlapping the first flat panel part in a view in a third direction orthogonal to both the first direction and the second direction;

a second flat portion overlapping the second flat panel part in the view;

a third flat portion overlapping the third flat panel part in the view;

a first bending portion overlapping the first segment part in the view; and a second bending portion overlapping the second segment part in the view.

11. A display device comprising:

a display panel comprising a display area and a non-display area adjacent to the display area; and a window disposed on an upper surface of the display panel, wherein the window comprises:

a first flat panel part;

a second flat panel part disposed on a side of the first flat panel part in a first direction; and a first segment part disposed between the first flat panel part and the second flat panel part, the first segment part comprises:

segments extending in a second direction intersecting the first direction and spaced apart from each other in the first direction; and bridges connecting respective segments, one of the bridges overlaps the display area of the display panel in a view in a third direction orthogonal to both the first direction and the second direction, and another one of the bridges forms at least one bent part curved in a direction toward the display panel.

12. The display device of claim 11, wherein each of the bridges is thinner than each of the segments.

13. The display device of claim 12, wherein the bridges comprise:

a first bridge corresponding to the another bridge, the first bridge overlapping the non-display area of the display panel in the view; and a second bridge corresponding to the one bridge and overlapping the display area in the view, the first bridge has a thickness in a range of about 20 μm to about 50 μm, and forms the at least one bent part curved in a direction toward the display panel, and the second bridge has a flat panel shape having a thickness in a range of about 20 μm to about 50 μm.

14. The display device of claim 13, further comprising:

a first adhesive member disposed between the display panel and the window, wherein a rear surface of each of the segments of the segment part is attached to the first adhesive member, and a lowermost end portion of the bent part of the first bridge is spaced apart from the first adhesive member.

15. The display device of claim 13, wherein the bridges comprise a third bridge disposed between the first bridge and the second bridge, and the third bridge overlaps the display area of the display panel in the view.

16. The display device of claim 15, wherein the third bridge forms at least one bent part bent in a direction toward the display panel, and a number of bent parts of the first bridge is greater than a number of bent parts of the third bridge.

17. A display device comprising:

a display panel comprising a first flat portion, a second flat portion disposed on a side of the first flat portion in a first direction, and a first bending portion disposed between the first flat portion and the second flat portion;

a window disposed on an upper surface of the display panel, the window comprising:

a first flat panel part overlapping the first flat portion in a view in a third direction orthogonal to the first direction;

a second flat panel part overlapping the second flat portion in the view; and a first segment part overlapping the first bending portion in the view;

a set member accommodating the display panel and the window, and a light shielding pattern disposed between the window and the set member, wherein the first segment part comprises:

segments extending in a second direction intersecting the first direction and being orthogonal to the third direction, the segments being spaced apart from each other in the first direction, and bridges, some of the bridges connecting corresponding first edge portions disposed at corresponding first ends of adjacent segments among the segments and some of the bridges connecting corresponding second edge portions disposed at corresponding second ends of adjacent segments among the segments, the second ends opposing the first ends in the second direction, the light shielding pattern is disposed directly on respective surfaces of the bridges facing the set member, and the set member comprises;

a first set member accommodating the first flat portion of the display panel and the first flat panel part of the window; and a second set member accommodating the second flat portion and the second flat panel part.

18. The display device of claim 17, wherein a curing resin is disposed between gap spaces of respective segments, and the set member comprises a bracket disposed between the first set member and the second set member, the bracket covering the first and second edge portions of the respective segments and the bridges.

19. The display device of claim 18, wherein the set member comprises a hinge part disposed between the first set member and the second set member, and the hinge part overlaps the bracket in the view.

20. The display device of claim 17, wherein the light shielding pattern is disposed directly on respective surfaces of the segments facing the set member.

* * * * *